(12) United States Patent
Kim et al.

(10) Patent No.: US 7,684,519 B2
(45) Date of Patent: Mar. 23, 2010

(54) METHOD AND SYSTEM FOR ADJUSTING DC OFFSET SLICE POINT IN AN RF RECEIVER

(75) Inventors: Hea Joung Kim, Irvine, CA (US);
Brima Ibrahim, Aliso Viejo, CA (US);
Henrik Tholstrup Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1212 days.

(21) Appl. No.: 11/102,157

(22) Filed: Apr. 8, 2005

(65) Prior Publication Data

US 2006/0093079 A1 May 4, 2006

Related U.S. Application Data

(63) Continuation-in-part of application No. 09/993,541, filed on Nov. 14, 2001, now Pat. No. 6,907,089.

(60) Provisional application No. 60/624,011, filed on Nov. 1, 2004.

(51) Int. Cl.
*H04L 25/06* (2006.01)
*H04L 25/10* (2006.01)

(52) U.S. Cl. .................. 375/319; 375/344; 375/317; 375/365; 375/334; 375/346; 455/41.2; 455/255

(58) Field of Classification Search .................. None
See application file for complete search history.

(56) References Cited

U.S. PATENT DOCUMENTS 5,365,187 A * 11/1994 Hornak et al. ............... 330/10
5,930,307 A * 7/1999 DeLuca ....................... 375/340
6,690,740 B1 * 2/2004 Mattisson et al. ............ 375/295
6,728,277 B1 * 4/2004 Wilson ....................... 372/38.1
6,851,493 B2 * 2/2005 Staszewski et al. .......... 175/376
6,947,495 B2 * 9/2005 Ezquerra-Moreu et al. .. 375/319
7,190,740 B2 * 3/2007 Chu et al. .................... 375/319
7,382,200 B2 * 6/2008 Staszewski et al. ........... 331/16
2002/0094052 A1 * 7/2002 Staszewski et al. .......... 375/376
2003/0058964 A1 * 3/2003 Ezquerra-Moreu et al. .. 375/319
2003/0091127 A1 * 5/2003 Jensen et al. ................. 375/324
2004/0179429 A1 * 9/2004 Preston ......................... 367/99

* cited by examiner

*Primary Examiner*—Shuwang Liu
*Assistant Examiner*—Gina McKie
(74) *Attorney, Agent, or Firm*—McAndrews, Held & Malloy, Ltd.

(57) ABSTRACT

A method for adjusting a DC offset slice point in an RF receiver is provided and may comprise estimating DC offset using a combination of fast tracking of an input signal and slow tracking of an input signal. If both are used, the fast tracking may be executed prior to executing the slow tracking. The fast tracking may acquire synchronizing signals transmitted before a payload. Additionally, noise tolerance may be increased in the fast tracking and the slow tracking by using tracking envelopes. The fast tracking may average acquisition envelopes and tracking envelopes using a fast tracking weighting factor to a sum of the acquisition envelopes and a slow tracking weighting factor to a sum of the tracking envelopes. Additionally, the slow tracking may average the tracking envelopes.

24 Claims, 15 Drawing Sheets

Example of a Bluetooth Piconet

Receiver 100

LO module 74

METHOD AND SYSTEM FOR ADJUSTING DC OFFSET SLICE POINT IN AN RF RECEIVER

CROSS-REFERENCE TO RELATED APPLICATIONS/INCORPORATION BY REFERENCE

The present application is a continuation-in-part of application Ser. No. 09/993,541, filed on Nov. 14, 2001 now U.S. Pat. No. 6,907,089. This patent application also makes reference to, claims priority to and claims benefit from U.S. Provisional Patent Application Ser. No. 60/624,011 filed on Nov. 1, 2004.

This application makes reference to:

U.S. patent application Ser. No. 11/102,123 filed Apr. 8, 2005;

U.S. patent application Ser. No. 11/101,961 filed Apr. 8, 2005; and

U.S. patent application Ser. No. 11/101,190 filed Apr. 8, 2005.

The above state applications are hereby incorporated herein by reference in their entirety.

FIELD OF THE INVENTION

Certain embodiments of the invention relate to processing RF signals. More specifically, certain embodiments of the invention relate to a method and system for adjusting a DC offset slice point in an RF receiver.

This invention relates generally to wireless communication systems and more particularly to frequency modulated radio frequency receivers used in such systems.

BACKGROUND OF THE INVENTION

Communication systems are known to support wireless and wireline communications between wireless and/or wireline communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, for example, a cellular telephone, two-way radio, personal digital assistant (PDA), personal computer (PC), laptop computer, or home entertainment equipment, communicates directly or indirectly with other wireless communication devices. For direct communications, also known as point-to-point communications, the participating wireless communication devices tune their receivers and transmitters to the same channel, or channels, and communicates over that channel(s). Each channel may utilize one or more of the plurality of radio frequency (RF) carriers of the wireless communication system. For indirect wireless communications, each wireless communication device communicates directly with an associated base station, for example, for cellular services, and/or an associated access point, for example, for an in-home or in-building wireless network, via an assigned channel or channels. To complete a communication connection between the wireless communication devices, the associated base stations and/or associated access points communicate with each other directly, via a system controller, via a public switch telephone network, via Internet, and/or via some other wide area network.

In order for each wireless communication device to participate in wireless communication, it utilizes a built-in radio transceiver, which comprises a receiver and a transmitter, or it is coupled to an associated radio transceiver, for example, a station for in-home and/or in-building wireless communication networks, or a RF modem. The transmitter converts data into RF signals by modulating the data in accordance with the particular wireless communication standard to produce a baseband signal. The baseband signal is mixed with a local oscillator signal in one or more intermediate frequency stages to produce the RF signal. The radio receiver generally includes an antenna section, a filtering section, a low noise amplifier, an intermediate frequency (IF) stage, and a demodulator. The antenna section receives the RF signal and provides it to the filtering section, which, in turn, passes a filtered RF signal to the low noise amplifier. The low noise amplifier amplifies the filtered RF signal and provides an amplified RF signal to the IF stage. The IF stage steps down the frequency of the amplified RF signal to an intermediate frequency or to baseband. The IF stage provides the IF signal or baseband signal to the demodulator, which recaptures the data in accordance with the demodulation protocol.

For the demodulator to accurately recover data from the IF signals or the baseband signals, unwanted direct current (DC) offsets must be overcome. DC offsets in the demodulated output of a frequency modulated (FM) system may occur when the local oscillator of a transmitting radio generates a signal with a slightly different frequency than the frequency of the signal produced by the receiving radio local oscillator. To correct for the DC offset, a demodulator in a radio receiver includes a DC offset detection circuit and DC offset compensation circuit. The DC offset detection circuit indicates a level of DC offset due to frequency mismatch. A DC compensation circuit may be adapted to remove the DC offset indicated by the DC offset detection circuit from the demodulated IF signals or baseband signals before data extraction. The DC offset due to frequency mismatch can adversely affect the data extracted from the IF or baseband signals.

For example, Bluetooth utilizes a 64-bit synchronization (SYNC) word, which comprises a predefined bit sequence. The 64-bit synchronization (SYNC) word is utilized for identifying devices that want to communicate with each other. Hence, devices wishing to communicate with each other must identify the 64-bit synchronization (SYNC) word via a correlation process. After successful correlation, communication may take place among the Bluetooth devices. The DC offset sometimes interferes with identification of the 64-bit synchronization (SYNC) word, and as a result, the 64-bit synchronization (SYNC) word is not correlated. As an example, if a synchronization threshold is set at 56 bits for a 64-bit synchronization (SYNC) word and the first 6 bits are misidentified due to the DC offset and there are three other bit errors in the remainder of the 64-bit synchronization (SYNC) word, then the synchronization pattern will be missed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for adjusting a DC offset slice point in an RF receiver, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
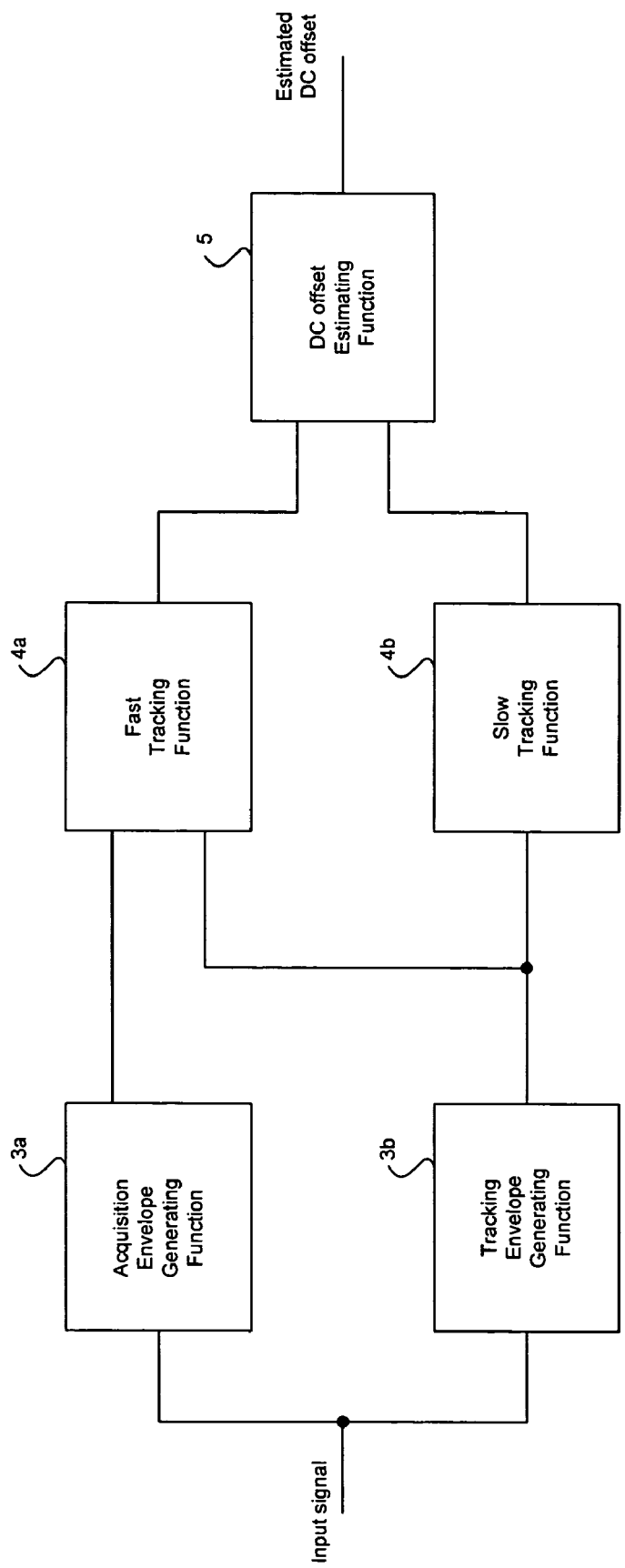
FIG. 1a is a high level diagram illustrating DC offset compensation, in accordance with an embodiment of the invention.

Certain embodiments of the invention provide a method and system for adjusting a DC offset slice point in an RF receiver. One aspect of the invention may provide a method for increasing the likelihood that a synchronization word or pattern may be identified in light of a DC offset. Accordingly, an embodiment of the invention may acquire an initial synchronization (SYNC) word by estimating a DC offset for the received signals. In this manner, the estimated DC offset may be utilized to determine whether the received signal is logic 1 or logic 0. This may be referred to as slicing a received signal to a 1 or a 0. A point of the DC offset used to slice the received signal may be referred to as a slicing point. Tracking circuitry may generate a fast tracking output signal that may quickly track received synchronizing signals. The tracking circuitry may also generate a slow tracking output of the received signals whose rate of change may be less than that of the fast tracking output signal.

The fast tracking may be referred to as the acquisition mode and the slow tracking may be referred to as tracking mode. During acquisition mode, the estimated DC offset may be generated from a weighted average of acquisition envelopes and tracking envelopes. During tracking mode, the estimated DC offset may be generated from the tracking envelopes. If only the quickly reacting acquisition envelopes are used in fast tracking, or acquisition mode, noise may cause errors that may prevent recognition of the SYNC word, and hence may result in missing packets, or payloads, of data. For example, during an initial acquisition time frame, the acquisition mode may quickly calculate the initial DC offset of the SYNC word based on a preamble pattern of 1s and 0s. However, after the preamble has been received, noise may affect the SYNC word such that a series of 1s or 0s may be received. The acquisition envelope may react quickly to the noise and erroneously estimate the DC offset that may be skewed too high or too low, respectively. The erroneous estimate for the DC offset may result in incorrectly slicing the remainder of the received signals, and therefore, this may prevent the recognition of the SYNC word. This may cause the payload that occurs after the SYNC word to be mischaracterized.

By using a weighted average that includes the more slowly reacting tracking envelopes, the fast tracking mode may still react quickly to the initial preamble, but lag behind the noise received at a later time. Slow tracking may take place after the SYNC word has been acquired in the acquisition mode. Since there is no need to quickly react to a preamble during the tracking mode, the quickly reacting acquisition envelopes may not be needed in generating DC offsets. In this regard, the fast tracking, or the acquisition mode, and the slow tracking, or the tracking mode, may be utilized to ensure that more accurate slicing points are determined. The fast tracking and the slow tracking may be utilized with various types of systems, for example, with frequency-shift keying (FSK) type packet demodulators, so as to provide a quick DC offset estimate that may be more noise tolerant later. By utilizing slow tracking and fast tracking, the size of the slicing window utilized to generate the slicing points may be effectively adjusted.

FIG. 1a is a high level diagram illustrating DC offset compensation, in accordance with an embodiment of the invention. Referring to FIG. 1a, there is shown an acquisition envelope generating function 3a, a tracking envelope generating function 3b, a fast tracking function 4a, a slow tracking function 4b, and a DC offset estimating function 5.

The acquisition envelope generating function 3a may comprise suitable logic, circuitry and/or code that may be adapted to generate input signal envelopes that generally follow local maxima and local minima of an input signal. The tracking envelope generating function 3b may comprise suitable logic, circuitry and/or code that may be adapted to generate input signal envelopes that exhibit a damped response of the local maxima and local minima of the input signal. The fast tracking function 4a may comprise suitable logic, circuitry and/or code that may be adapted to generate an output signal that is a weighted average of the acquisition envelopes and the tracking envelopes. The slow tracking function 4b may comprise suitable logic, circuitry and/or code that may be adapted to generate an output signal that is an average of the tracking envelopes. The DC offset estimating function 5 may comprise suitable logic, circuitry and/or code that may be adapted to utilize the outputs signals from the fast tracking function 4a and the slow tracking function 4b to generate a DC offset signal.

In accordance with an embodiment of the invention, the DC offset may be estimated using a combination of the fast tracking function 4a and the slow tracking function 4b. The fast tracking function 4a may be executed prior to execution of the slow tracking function 4b. The fast tracking function 4a may acquire synchronizing signals transmitted before a payload. Additionally, noise tolerance may be increased via the tracking envelopes utilized by both the fast tracking function 4a and the slow tracking function 4b. The fast tracking function 4a may generate a weighted average of the acquisition envelopes from the acquisition envelope generating function 3a and the tracking envelopes from the tracking envelope generating function 3b. The weighted average may be generated using a fast tracking weighting factor and a slow tracking weighting factor. The slow tracking function 4b may average the tracking envelopes from the tracking envelope generating function 3b using a slow tracking weighting factor.

Figure 1B:
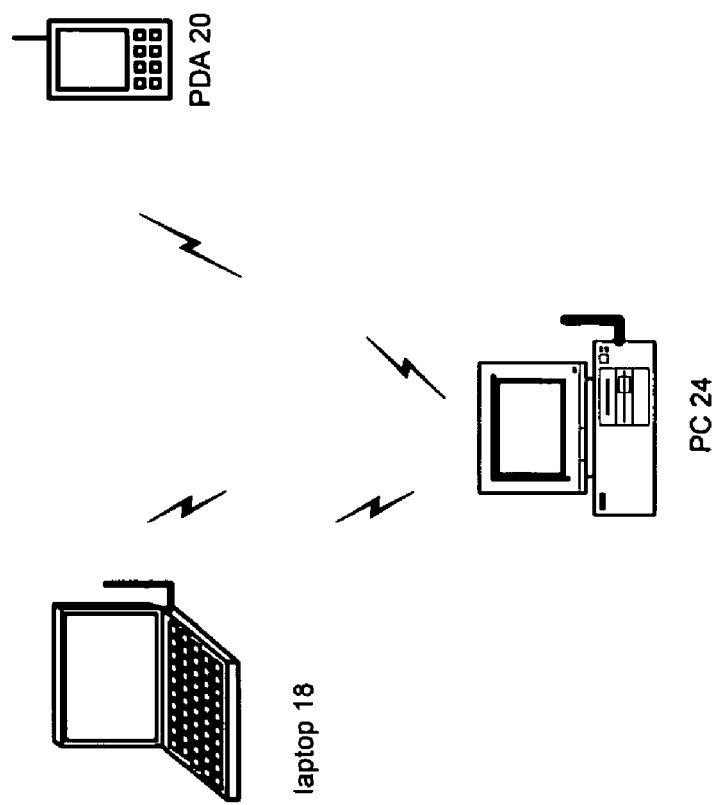
FIG. 1b illustrates a Bluetooth piconet that may be utilized in connection with an embodiment of the invention.

FIG. 1b illustrates a Bluetooth piconet that may be utilized in connection with an embodiment of the invention. Referring to FIG. 1b, there is shown a laptop 18, a personal digital assistant (PDA) 20, and a personal computer (PC) 24. These three devices may have Bluetooth compliant communication cards, and therefore may be able to communicate using Bluetooth protocol. One Bluetooth device in a piconet may be designated as a master and others as slaves. The designation process may be a dynamic process each time a piconet is set up. A device may be designated as a master device for one piconet, and a slave device for another piconet. The designation may be based on an algorithm that takes in to account performance and power requirements of the piconet and the various devices.

Once a device is designated as a master device, the master Bluetooth device, for example, the laptop 18, may broadcast a query to see if there are any slave devices within an address range to which it may belong. Various devices may fall in to a specific address range determined by a consortium of Bluetooth manufacturers. All devices in the same address range may be a part of a piconet that may be limited to a maximum range of, for example, 10 meters. The Bluetooth standard allows three different ranges of 10 meters, 20 meters and 100 meters. Although only a single piconet is illustrated, in a system comprising a plurality of piconets, it is possible for a device to operate as a master in one piconet and as a slave in an adjacent piconet. For example, a Bluetooth device A may operate as a master in a first piconet $P_1$ and as a slave in a second piconet $P_2$. In another example, the Bluetooth device A may operate as a slave in a first piconet $P_1$ and as a master in a second piconet $P_2$.

PCs, PDAs and laptops may share the same address range. Similarly, cordless phone bases and cordless handsets may share another address range. Additionally, cell phones and car speaker kits may share yet another address range. When a master Bluetooth device, for example, the laptop 18, receives replies from slave devices, for example, the PC 24 and the PDA 20, the master may communicate with each of the slave devices. However, the slave devices may not talk directly with each other. When the master device moves out of range of communication, the piconet may be destroyed until another device can be designated as a master device.

Figure 1C:
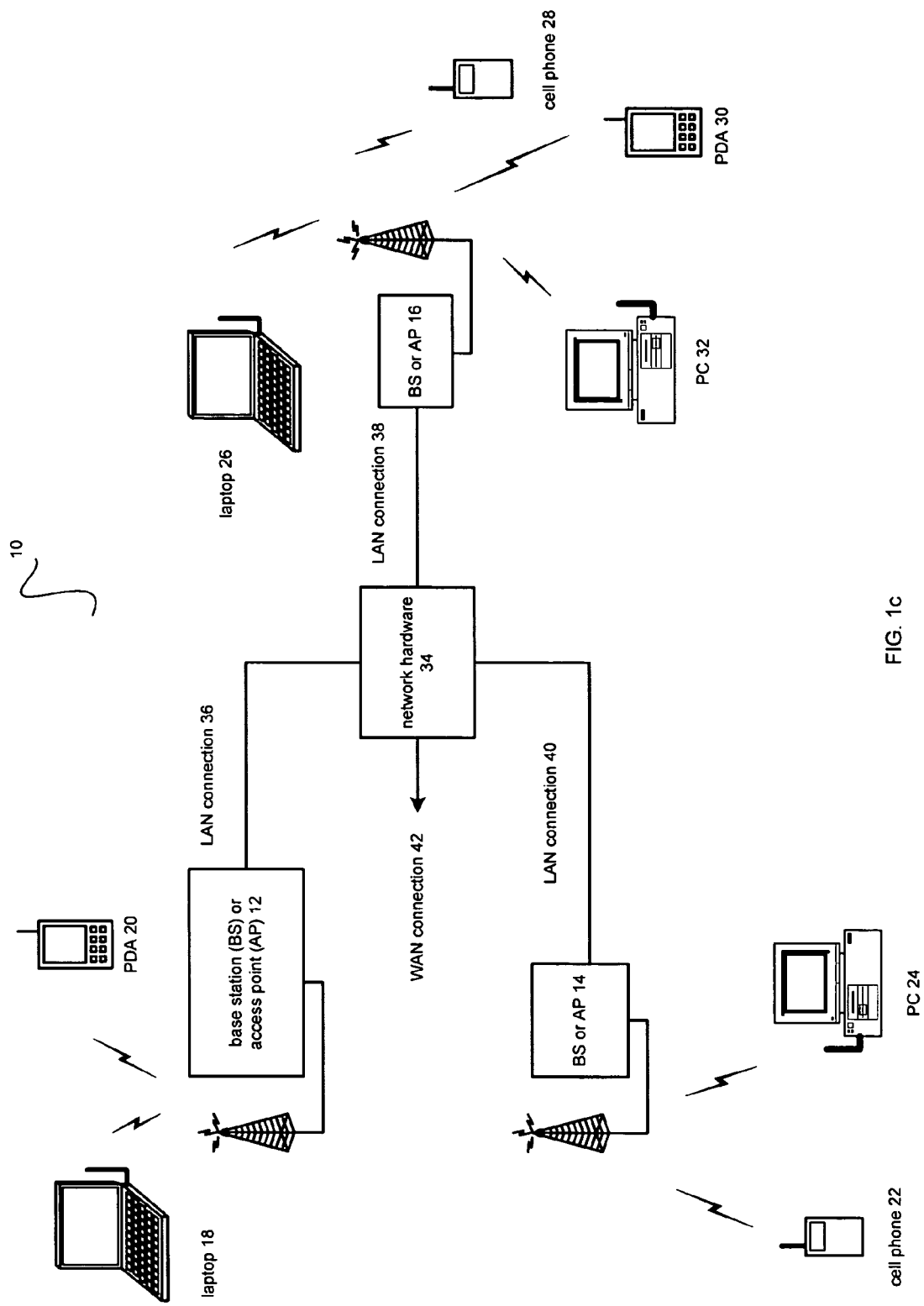
FIG. 1c illustrates a block diagram of a wireless communication system that may be utilized in connection with an embodiment of the invention.

FIG. 1c illustrates a block diagram of a wireless communication system that may be utilized in connection with an embodiment of the invention. Referring to FIG. 1c, there is shown a block diagram of a communication system 10 that comprises a plurality of base stations and/or access points 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIG. 2.

The base stations or access points 12-16 may be operably coupled to the network hardware 34, for example, via local area network connections 36, 38 and 40. The network hardware 34, for example, a router, switch, bridge, modem, or system controller, may provide a wide area network connection 42 for the communication system 10. Each of the base stations or access points 12-16 may have an associated antenna or antenna array to communicate with the wireless communication devices in its area. Typically, the wireless communication devices may register with a particular base station or access point 12-16 to receive services from the communication system 10. For direct connections, for example, point-to-point communications, wireless communication devices may communicate directly via an allocated channel.

Typically, base stations are used for cellular telephone systems and similar type of systems, while access points are used for in-home or in-building wireless networks, although those terms are often used interchangeably. Regardless of the particular type of communication system, each wireless communication device includes a built-in radio and/or is coupled to a radio. The radio may be adapted to utilize DC offset compensation as disclosed herein to enhance performance of radio receivers, including receivers within radio frequency integrated circuits.

Figure 2:
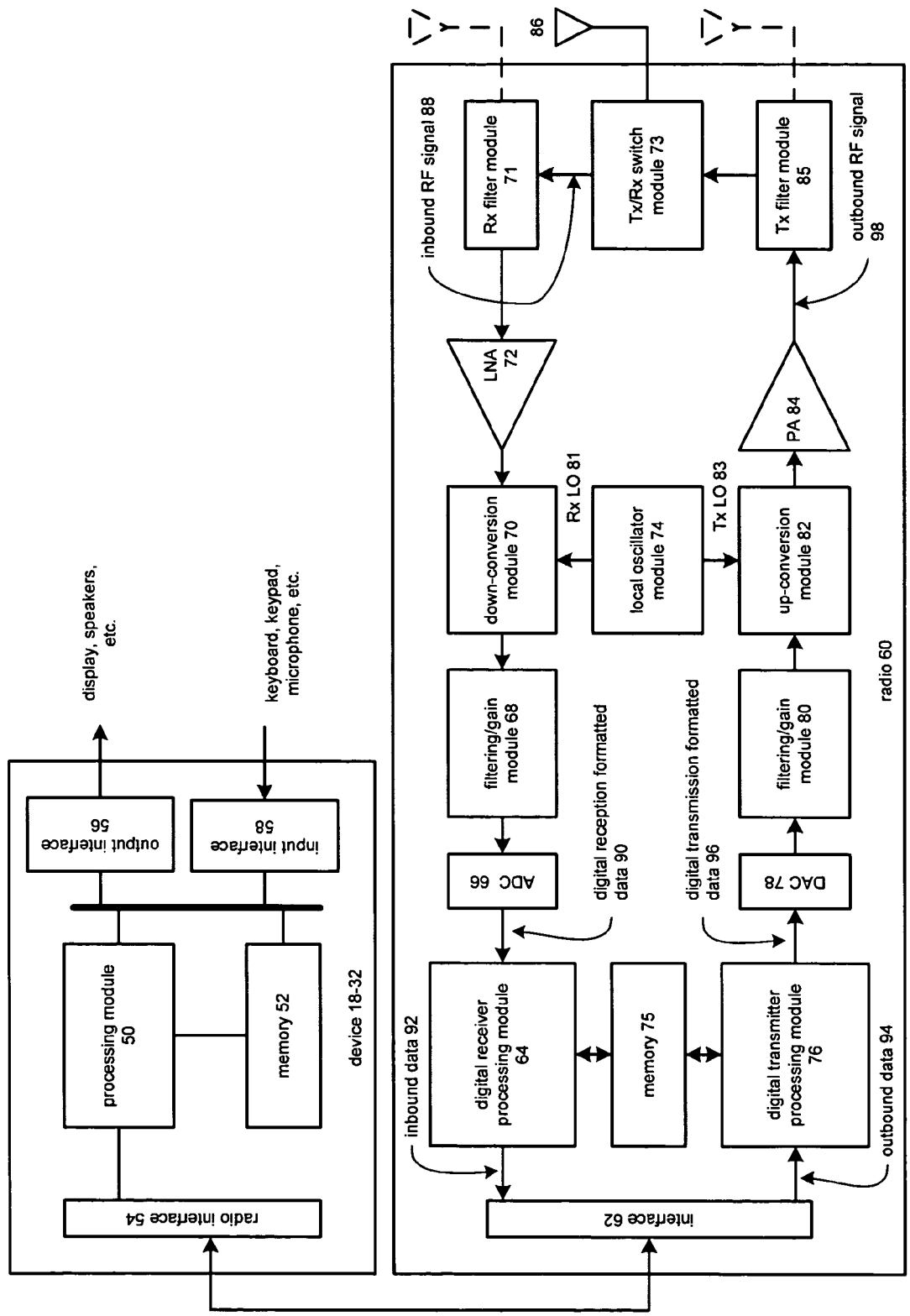
FIG. 2 illustrates a block diagram of a wireless communication device, in accordance with an embodiment of the invention.

FIG. 2 illustrates a block diagram of a wireless communication device, in accordance with an embodiment of the invention. Referring to FIG. 2, there is shown the devices 18-32 and an associated radio 60. For cellular telephones, the radio 60 may be an integrated or a built-in component. For personal digital assistants (PDAs), laptops, and/or personal computers, the radio 60 may be a built-in or an externally coupled component. For example, the radio may be a plug-in card that may be coupled via a USB interface or other suitable interface As illustrated, the device 18-32 may include a processing module 50, a memory 52, a radio interface 54, an output interface 56 and an input interface 58. The processing module 50 and the memory 52 may execute corresponding instructions that may be typically executed by a device. For example, for a cellular telephone device, the processing module 50 may perform the corresponding communication functions in accordance with a particular cellular telephone standard.

The radio interface 54 may be adapted to allow data to be received from and sent to the radio 60. For data received from the radio 60, for example, inbound data, the radio interface 54 may provide the data to the processing module 50 for further processing and/or routing to the output interface 56. The output interface 56 may provide connectivity to an output display device, for example, a display, a monitor, or speakers, such that the received data may be output. The radio interface 54 also provides outbound data from the processing module 50 to the radio 60. The processing module 50 may receive the outbound data from an input device, for example, a keyboard, a keypad, or a microphone, via the input interface 58. the processing module 50 may generate the data itself. For data received via the input interface 58, the processing module 50 may perform a corresponding function on the data and/or route it to the radio 60 via the radio interface 54.

Radio 60 may comprise an interface 62, a receiver section, a transmitter section, local oscillator module 74, an antenna switch 73, and an antenna 86. The receiver section may comprise a digital receiver processing module 64, analog-to-digital converter 66, filtering/gain module 68, down conversion module 70, receiver filter module 71, low noise amplifier 72, and at least a portion of memory 75. The transmitter section may include a digital transmitter processing module 76, a digital-to-analog converter 78, a filtering/gain module 80, an up-conversion module 82, a power amplifier 84, a transmitter filter module 85, and at least a portion of memory 75. The antenna 86 may be a single antenna that is shared by both the transmit and receive paths via the antenna switch 73. Alternatively, there may be separate antennas for the transmit path and receive path and antenna switch 73 may be omitted. The antenna implementation may depend on the particular standard to which the wireless communication device is compliant.

The digital receiver processing module 64 and the digital transmitter processing module 76, in combination with operational instructions stored in memory 75, may execute digital receiver functions and digital transmitter functions, respectively. The digital receiver functions may include, but are not limited to, digital intermediate frequency to baseband conversion, demodulation, constellation demapping, decoding, and/or descrambling. Another digital receiver function may be estimating DC offsets. The digital transmitter functions may include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor (DSP), microcomputer, central processing unit, field programmable gate array (FPGA), application specific integrated circuit (ASIC), programmable logic device (PLD), state machine, logic circuitry, analog circuitry, digital circuitry, and/or any device that manipulates analog and/or digital signals based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that if the processing module 64 and/or 76 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry.

In operation, the radio 60 may be adapted to receive outbound data 94 from the device via the interface 62. The interface 62 routes the outbound data 94 to the digital transmitter processing module 76, which processes the outbound data 94 in accordance with a particular wireless communication standard, for example, IEEE 802.11a, IEEE 802.11b, or Bluetooth, to produce a digital transmission formatted data 96. The digital transmission formatted data 96 may be a digital baseband signal or a digital low IF signal whose modulation frequency may be in the range of zero hertz to a few megahertz.

The digital-to-analog converter 78 may be adapted to convert the digital transmission formatted data 96 from digital domain to analog domain. The filtering/gain module 80 may filter and/or adjust the gain of the analog signal prior to providing it to the up-conversion module 82. The up-conversion module 82 may directly convert the analog baseband or low IF signal into an RF signal based on a transmitter local oscillator signal provided by local oscillator module 74, which may be implemented in accordance with the teachings of the present invention. The power amplifier 84 may amplify the RF signal to produce an outbound RF signal 98, which may be subsequently filtered by the transmitter filter module 85. The antenna 86 may transmit the outbound RF signal 98 to a targeted device such as a base station, an access point and/or another wireless communication device.

The radio 60 may receive an inbound RF signal 88 via the antenna 86 that was transmitted by a base station, an access point, or another wireless communication device. The antenna 86 may provide the inbound RF signal 88 to the receiver filter module 71, which may filter the inbound RF signal 88 and provide a filtered RF signal to the low noise amplifier 72. The low noise amplifier 72 may amplify the filtered RF signal and provide an amplified inbound RF signal to the down conversion module 70, which may directly convert the amplified inbound RF signal into an inbound low IF signal. This may be done utilizing the receiver's local oscillator signal provided by the local oscillator module 74, which may be implemented in accordance with the teachings of the present invention. The down conversion module 70 may provide the inbound low IF signal to the filtering/gain module 68, which may filter and/or adjust the gain of the signal before providing it to the analog to digital converter 66.

The analog-to-digital converter 66 may convert the filtered inbound low IF signal from the analog domain to the digital domain to produce digital reception formatted data 90. The digital receiver processing module 64 may decode, descramble, demap, and/or demodulate the digital reception formatted data 90 to recapture inbound data 92 in accordance with the particular wireless communication standard being implemented by radio 60. The interface 62 may provide the recaptured inbound data 92 to the devices 18-32 via the radio interface 54.

The radio may be implemented in a variety of ways to receive RF signals and to transmit RF signals, and may be implemented using a single integrated circuit or multiple integrated circuits. Further, at least some of the modules of the radio 60 may be implemented on the same integrated circuit with at least some of the modules of the devices 18-32. Regardless of how the radio is implemented, the concepts of the present invention are applicable.

Figure 3:
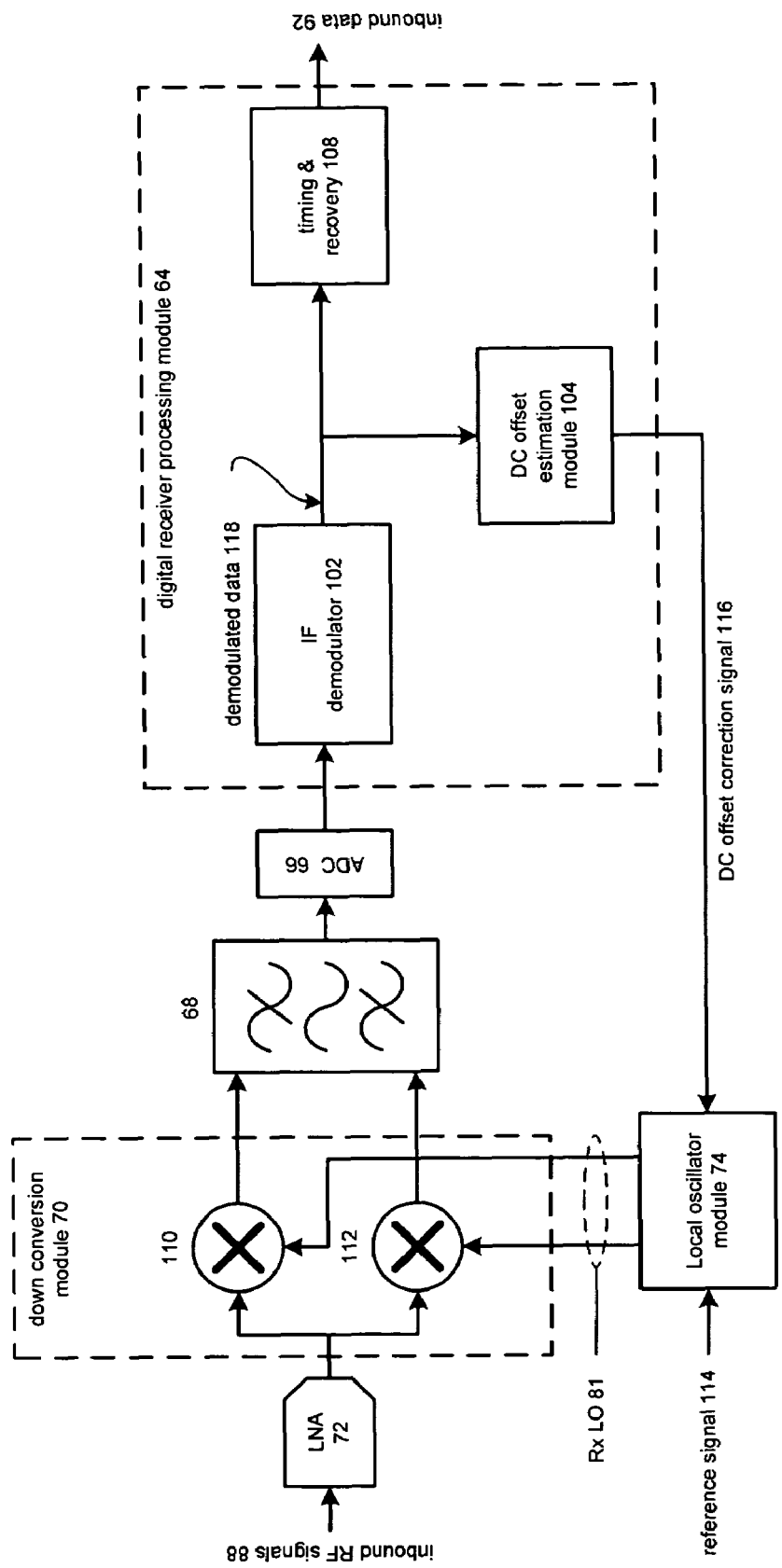
FIG. 3 illustrates a block diagram of a receiver, in accordance with an embodiment of the invention.

FIG. 3 illustrates a block diagram of a receiver, in accordance with an embodiment of the invention. Referring to FIG. 3, there is shown a receiver 100 that may be utilized in the wireless communication device of FIG. 2. The receiver 100 may include the low noise amplifier 72, down conversion module 70, a bandpass filter for the filtering gain module 68, the analog to digital converter 66, the local oscillator module 74, and the digital receiver processing module 64. In this implementation, the digital receiver processing module 64 may be configured to function as an IF demodulator 102, a DC offset estimation module 104, and a timing and recovery module 108. The down conversion module 70 may include a 1st mixer 110 and a 2nd mixer 112.

In operation, the low noise amplifier 72 may receive and filter inbound RF signals 88, which may have been produced by mixing baseband signals with a local oscillator signal within a transmitting radio. The filtered signals may be provided to the 1st and 2nd mixers 110 and 112 of the down conversion module 70. The 1st mixer 110 may mix an in-phase component of the RF signals 88 with an in-phase component of the receiver's local oscillator signal 81. The 2nd mixer 112 may mix a quadrature component of the RF signals 88 with a quadrature component of the receiver's local oscillator signal 81. Initially, the receiver's local oscillator signal 81 may be generated solely based on the reference signal 114. As such, the frequency of the receiver's local oscillator signal 81 may not match the frequency of the local oscillator signal of the transmitting radio that transmitted the RF signals 88. As such, a DC offset may initially result.

The bandpass filter 68 may filter the mixed signals produced by the down-conversion module 70 and provide a low IF signal to the analog to digital converter 66. The analog to digital converter 66 may convert the low IF analog signals to low IF digital signals.

The IF demodulator 102 may receive the digital IF signals, and demodulate them via the IF demodulator 102 to produce demodulated data 118. The DC offset estimation module 104 may interpret the demodulated data 118 to determine a DC offset value. The determined DC offset value may be used to generate a DC offset correction signal 116, which may be fed back to the local oscillator module 74. The DC offset estimation module 104 may determine the specific value that the local oscillator module is to be adjusted by and such information may be contained within the DC offset correction signal 116. Alternatively, the DC offset correction signal 116 may include an indication of the value of the DC offset, such that the local oscillator module 74 may process the DC offset to determine the amount of local oscillator adjustment needed.

The timing and recovery module 108 may receive the demodulated data 118 and produce therefrom, inbound data 92. Initially, prior to direct DC offset compensation, the inbound data 92 may include errors. As such, it may be desirable to generate the DC offset correction signal 116 and modify the receiver's local oscillator signal 81 as soon as possible so that the inbound data 92 may be corrected as quickly as possible. For instance, it may be desirable to determine the DC offset correction signal 116 during a training sequence of the radio receiver or during the initial phases of receiving a preamble of a signal.

Figure 4:
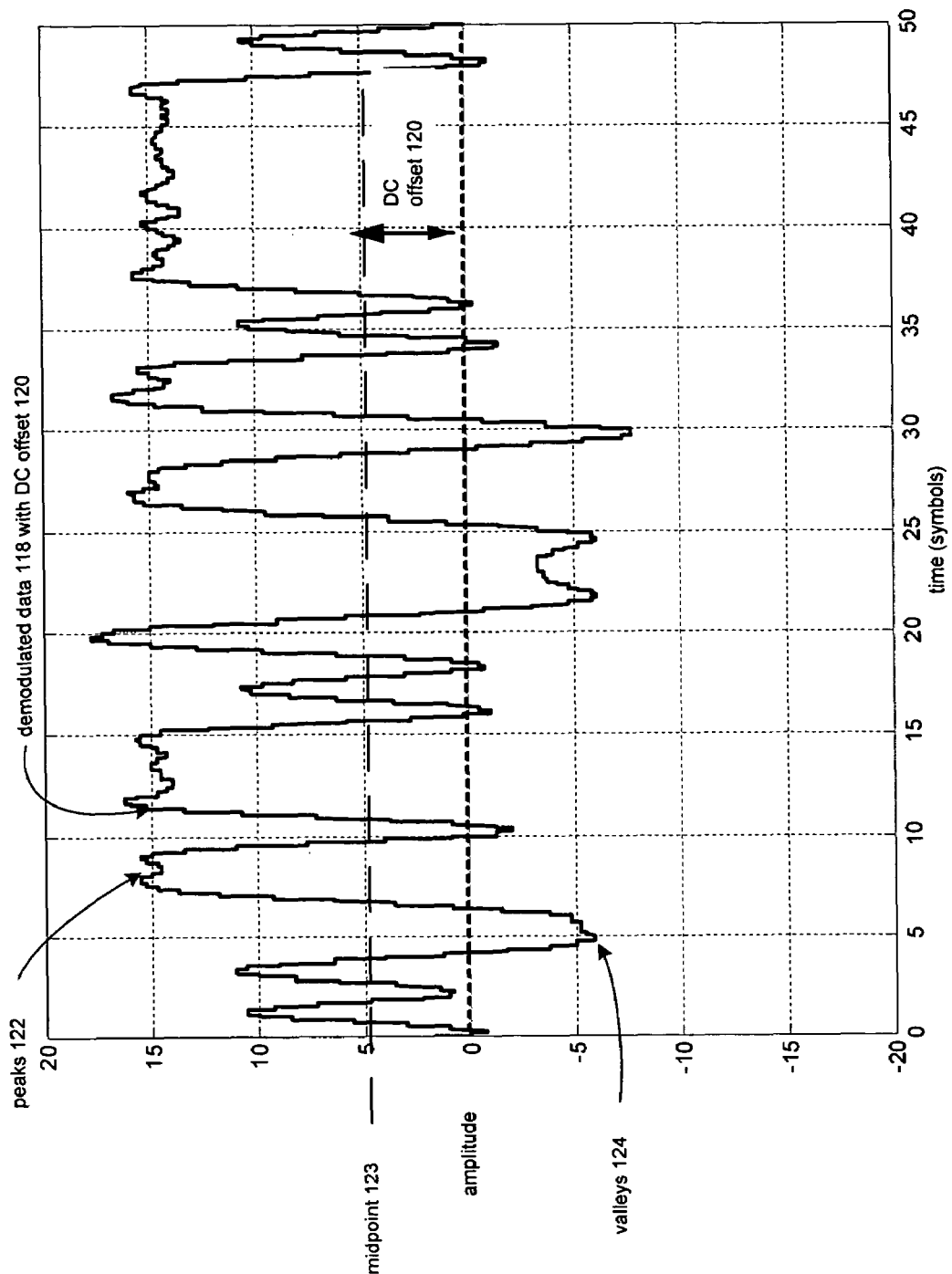
FIG. 4 illustrates a graphical representation of typical demodulated data without DC offset correction, which may be utilized in connection with an embodiment of the invention.

FIG. 4 illustrates a graphical representation of typical demodulated data without DC offset correction, which may be utilized in connection with an embodiment of the invention. Referring to FIG. 4, there is shown the demodulated data 118 with the DC offset. Peaks and valleys 122 and 124 of the demodulated data are identified. The DC offset estimation module 104 may use the peaks and valleys to determine a midpoint 123 between an average peak value and an average valley value. The DC offset estimation module 104 may compare the midpoint 123 to zero amplitude and determine the DC offset 120 to be a difference between the midpoint 123 and the zero amplitude.

Figure 5:
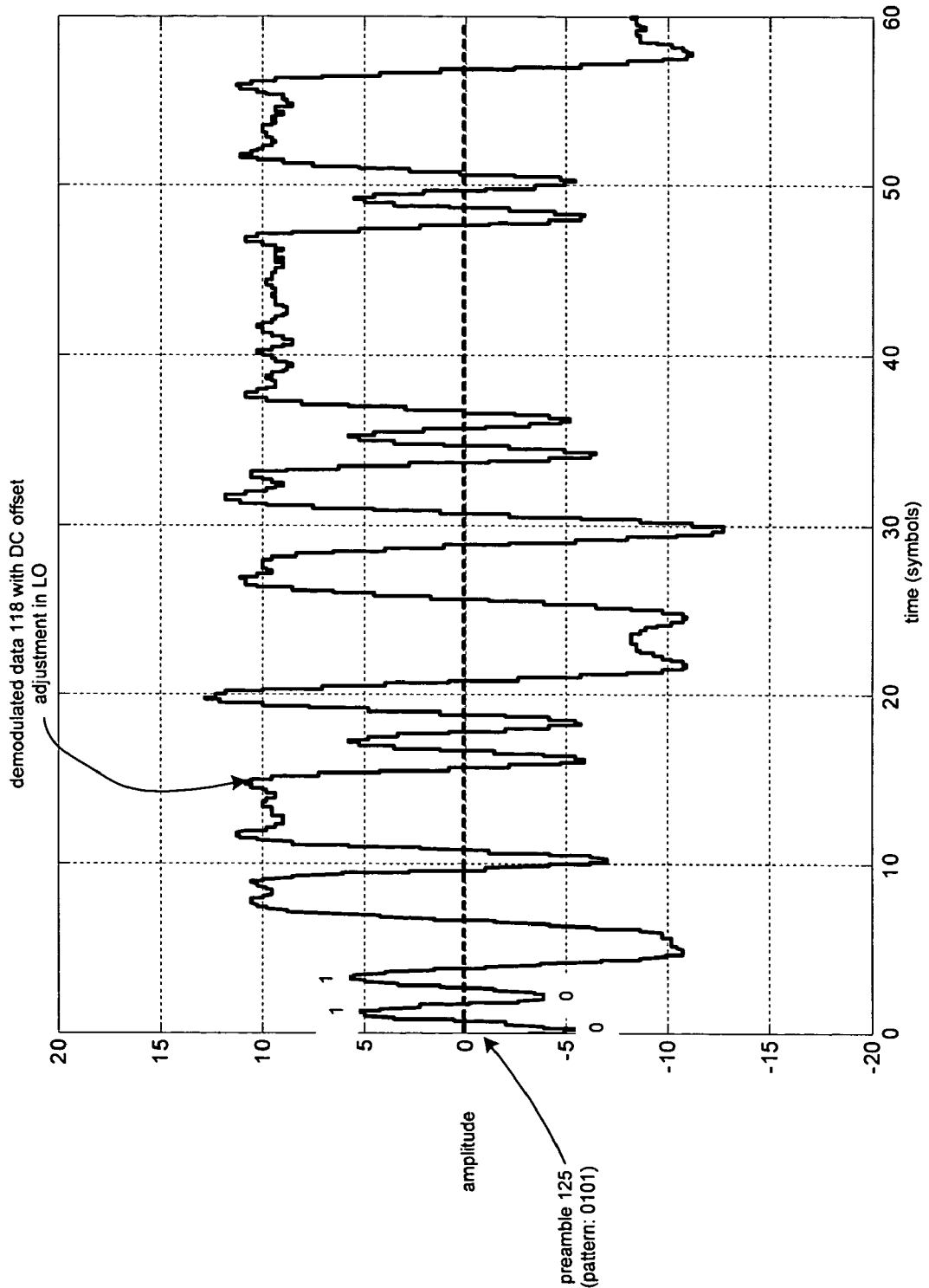
FIG. 5 illustrates a graphical representation of typical demodulated data with DC offset correction, in accordance with an embodiment of the invention.

FIG. 5 illustrates a graphical representation of typical demodulated data with DC offset correction, in accordance with an embodiment of the invention. Referring to FIG. 5, there is shown the demodulated data 118 that is produced after the local oscillator is adjusted in accordance with the DC offset correction signal 116. In this particular example, a beginning of the demodulated data 118 includes a preamble 125, which has a particular pattern. In this example, the pattern is 0101. As such, it may be desirable to generate the DC offset correction signal 116 during this preamble phase so that the receiver's local oscillator signal 81 may be adjusted to better match the local oscillator signal of the transmitting radio in order to avoid creating the DC offset.

Figure 6:
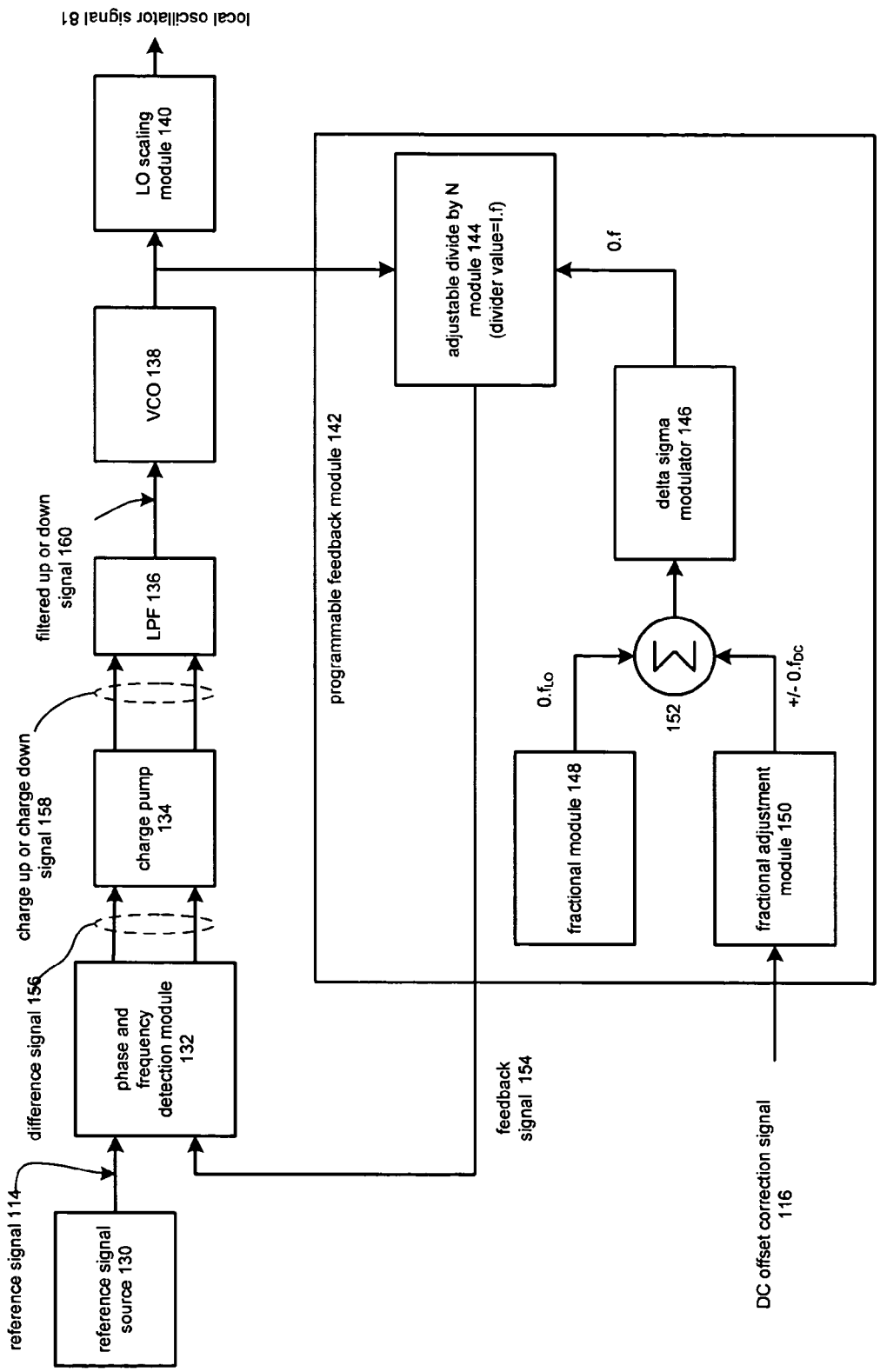
FIG. 6 illustrates a block diagram of a local oscillator module, in accordance with an embodiment of the invention.

FIG. 6 illustrates a block diagram of a local oscillator module, in accordance with an embodiment of the invention. Referring to FIG. 6, there is shown the local oscillator module 74 and/or a self-correcting clock circuit that may be utilized in data recovery circuits. The local oscillator module 74 may include a reference signal source 130, a phase and frequency detection module 132, a charge pump 134, a low pass filter 136, a voltage controlled oscillator (VCO) 138, a local oscillator scaling module 140, which may be optional, and a programmable feedback module 142. The programmable feedback module 142 may include an adjustable divide by N-module 144, a Delta Sigma modulator 146, a fractional module 148, a fractional adjustment module 150, and a summing module 152.

The reference signal source 130 may be adapted to produce a reference signal 114. The phase and frequency detection module 132 may compare the reference signal 114 with a feedback signal 154 to produce a difference signal 156. The charge pump 134 may convert the difference signal into a charge-up signal or a charge-down signal 158. The low pass filter 136 may filter the charge-up or charge-down signal to produce a filtered-up or down signal 160. The VCO 138 may generate an output signal in accordance with the filtered-up or filtered-down signal 160. The output signal may be provided to the programmable feedback module 142 and may also be provided to a local oscillator scaling module 140. If the local oscillator module 74 does not include the local oscillator scaling module 140, the output of the VCO is the receiver's local oscillator signal 81. Otherwise, the output of the local oscillator scaling module 140 may be the receiver's local oscillator signal 81.

The local oscillator scaling module 140 may be constructed in such a way that the output signal produced by the VCO 138 may have a frequency approximately ⅔ that of the receiver's local oscillator signal 81. As such, the scaling module 140 may divide the frequency of the output signal from the VCO 138 by two and then multiply the frequency of the resulting signal by three to produce the receiver's local oscillator signal 81.

The adjustable divide by N-module 144 may divide the output signal of the VCO 138 by a divider value. The divider value may include an integer portion, represented by I, and a fractional portion, represented by f. The fractional portion 0.f, may be produced by a combination of the fractional portion, $0.f_{LO}$, stored in the fractional module 148 and a fractional adjustment portion, $0.f_{DC}$, which may be produced by the fractional adjustment module 150. The fractional value, $0.f_{LO}$, may correspond to the desired fractional portion of the divider value. For example, assume that the desired output signal frequency of the VCO 138 is 1 gigahertz and the reference signal frequency is 15 megahertz. As such, the divider value, a predetermined local oscillator value, for this example is 66.667. As such, the integer portion of the divider value for this example is 66 and the fractional value is 0.667. If, however, the local oscillator of the transmitting radio, which produced the received RF signals, has a VCO output signal frequency of 1.002 gigahertz, the receiver will have a DC offset.

Accordingly, to remove the DC offset, the fractional adjustment module 150 may generate a fractional adjustment value based on the DC offset correction signal 116 to adjust the receiver's local oscillator signal 81 such that it substantially matches the local oscillator signal of the transmitting radio. For this example, the divider value to result in a 1.002 gigahertz output from VCO 138 is 66.800. Since the fractional module 148 may be providing a fractional value of 0.667, the fractional adjustment module 150 may need to produce a fractional value of 0.133. This value may result from subtracting 0.667 from 0.800. The summing module 152 may sum the fractional portion produced by the fractional module 148 and the fractional adjustment value produced by the fractional adjustment module 150. The summed fractional portion may be processed by the Sigma Delta modulator 146 to produce the resultant fractional value, $0.f_{LO}$, which may adjust the divider value of the adjustable divide by N-module 144 accordingly.

The fractional adjustment module 150 may be a lookup table that includes a plurality of fractional adjustment values that are indexed by the DC offset correction signal. The indexed fractional adjustment value may then be stored in a register, which is provided to summing module 152. Alternatively, the fractional adjustment module 150 may include processing that determines the fractional adjustment value from the DC offset correction signal 116 to produce the desired fractional adjustment value. As a further alternative, the DC offset estimation module 104 (FIG. 3) may determine the fractional adjustment value such that the fractional adjustment module 150 may include a register for storing the fractional adjustment value. Regardless of the particular method for determining the fractional adjustment value, the DC offset may be corrected by adjusting the frequency of the local oscillator signal of the receiver to substantially match the frequency of the local oscillator signal of the radio that transmitted the RF signals. As such, radio receivers may have negligible DC offset, thus reducing any potential errors associated with DC offsets.

Figure 7:
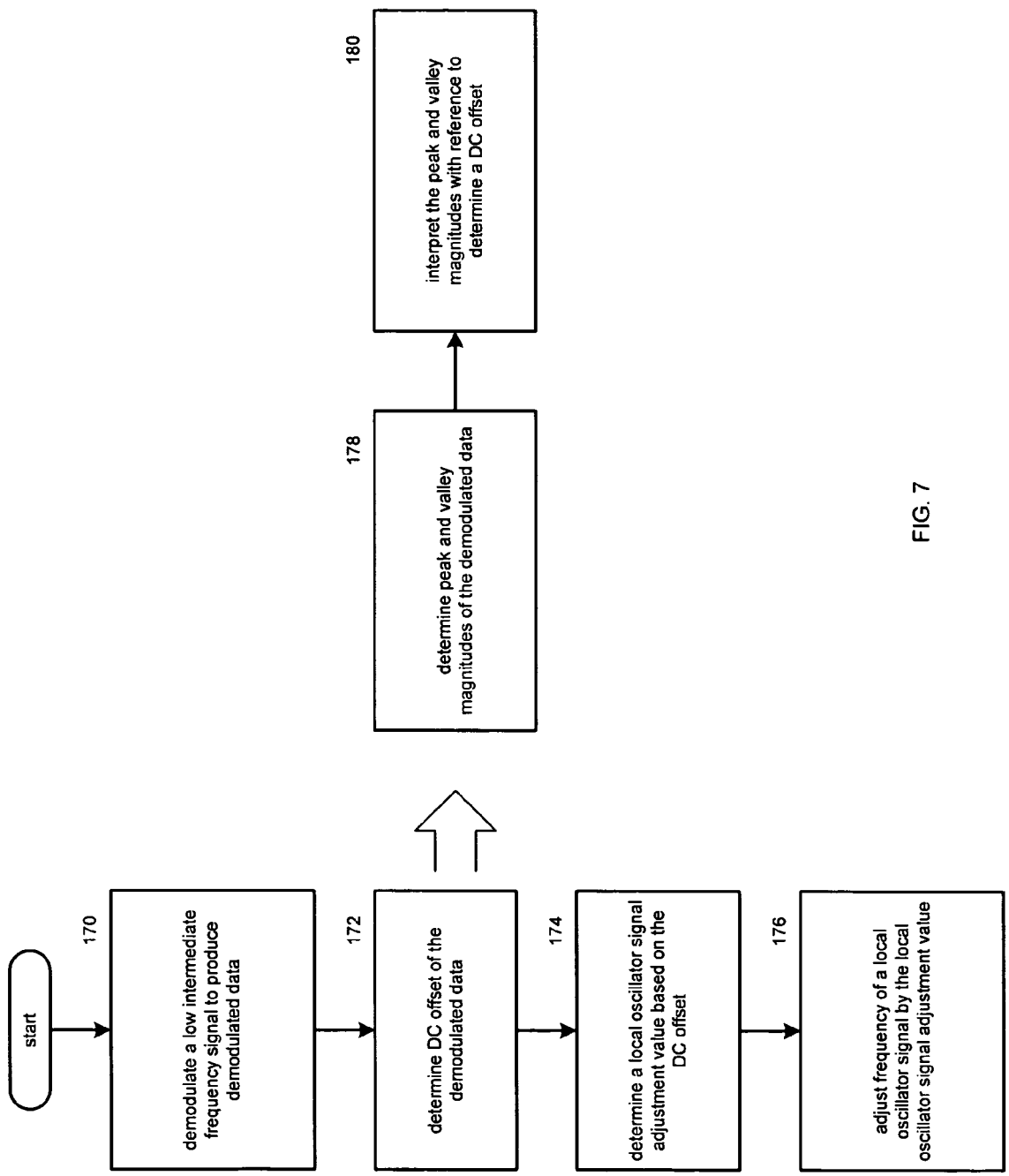
FIG. 7 illustrates a flow diagram of a method for DC offset compensation in a receiver, in accordance with an embodiment of the invention.

FIG. 7 illustrates a flow diagram of a method for DC offset compensation in a receiver, in accordance with an embodiment of the invention. Referring to FIG. 7, the process begins at Step 170 where a low intermediate frequency signal may be demodulated to produce demodulated data. The process then proceeds to step 172 where a DC offset of the demodulated data may be determined. This may be done as illustrated in Steps 178 and 180. At step 178, peak and valley magnitudes of the demodulated data may be determined. Based on the peak and valley magnitudes, a midpoint value of the demodulated data may be determined. The process then proceeds to step 180 where the midpoint of the peak and valley magnitudes may be interpreted with reference to the zero magnitude to determine a DC offset.

Returning to the main flow of the flow diagram, the process proceeds to step 174 where a local oscillator signal adjustment value may be determined based on the DC offset. The process then proceeds to step 176 where the frequency of the local oscillator signal may be adjusted in accordance with the local oscillator signal adjustment value.

Figure 8:
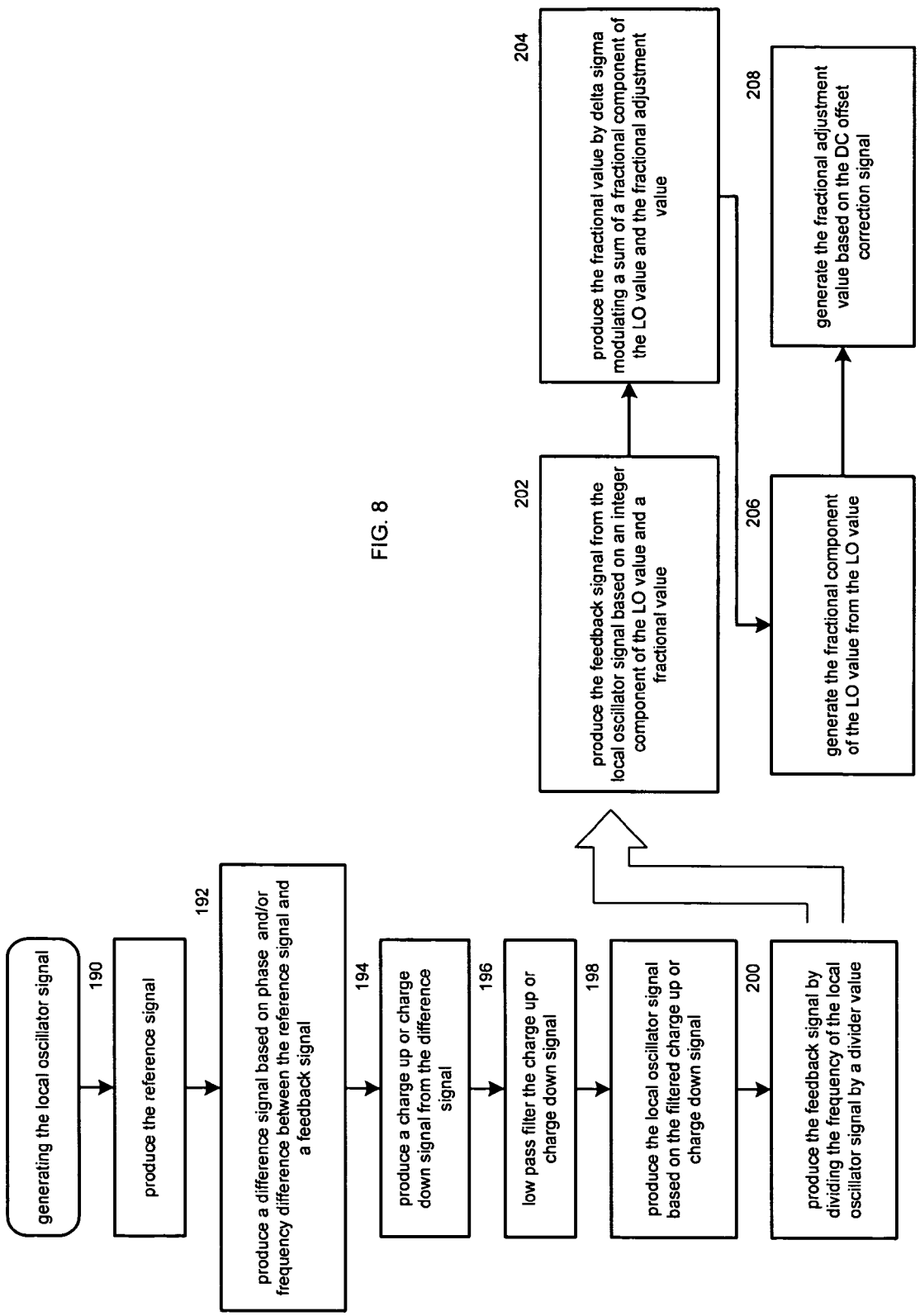
FIG. 8 illustrates a flow diagram that further describes the generating of the local oscillator signal of the logic diagram of FIG. 7, which may be utilized in connection with an embodiment of the invention.

FIG. 8 illustrates a flow diagram that further describes the generating of the local oscillator signal of the logic diagram of FIG. 7, which may be utilized in connection with an embodiment of the invention. Referring to FIG. 8, the processing begins at step 190 where a reference signal may be produced. The process then proceeds to step 192 where a difference signal may be produced based on a phase and/or frequency difference between the reference signal and a feedback signal. The process then proceeds to step 194 where a charge-up or charge-down signal may be produced from the difference signal.

The process then proceeds to step 196 where the charge-up or charge-down signal may be low pass filtered to produce a filtered charge-up or charge-down signal. The process then proceeds to step 198 where a local oscillator signal may be produced based on the filtered charge-up or filtered charge-down signal. Alternatively, the local oscillator signal, generated by a self-correcting clock module, may be referred to as a recovery clock. The process then proceeds to step 200 where the feedback signal may be produced by dividing the frequency of the local oscillator signal by a divider value. The divider value may be in accordance with a predetermined local oscillator value and a fractional adjustment value that may be based on the DC offset correction signal. The predetermined local oscillator value may represent the divider value needed to produce the local oscillator signal from the reference signal without accounting for DC offset. The fractional adjustment value may cause the divider value to be adjusted such that the local oscillator signal frequency of the receiver may substantially match the local oscillator signal frequency of the transmitting radio.

The correction of the feedback signal may be further described with reference to steps 202-208. At step 202, the feedback signal may be produced from the local oscillator signal, or VCO output signal, based on the divider value, which may include an integer value and a fractional value. The process then proceeds to step 204 where the fractional value may be produced by a Delta Sigma modulation on a sum of a fractional component of the local oscillator value and the fractional adjustment value. The process then proceeds to step 206 where the fractional component of the local oscillator value may be generated based on the local oscillator value. The process then proceeds to step 208 where the fractional adjustment value may be generated based on the DC offset correction signal. This may be done by utilizing a lookup table to index one of a plurality of fractional adjustment values based on the DC offset correction signal and storing the fractional adjustment value. Alternatively, the fractional adjustment value may be calculated based on the DC offset correction signal.

In accordance with another embodiment of the invention, a receiver may comprise a low noise amplifier (LNA), a down conversion mixing module, a local oscillator module, a bandpass filter, a demodulation module, and a DC offset estimation module. The low noise amplifier, the down conversion mixing module, the bandpass filter, and the demodulation module may be operably coupled to recapture data from a received radio frequency (RF) signal. The local oscillator module may be operably coupled to generate the local oscillator signal based on a reference signal and a DC offset correction signal. The DC offset estimation module may be operably coupled to generate the DC offset correction signal based on a determined a DC offset. The DC offset estimation module may determine the DC offset prior to compensation of the local oscillator, such as during a test sequence and/or during a preamble. As such, the local oscillator may initially produce the local oscillator signal based on the reference signal and, once the DC offset correction signal has been determined, the receiver local oscillator signal frequency may be adjusted based on the determined DC offset to substantially match the local oscillator signal frequency of the transmitting radio.

The preceding discussion has presented a method and apparatus for directly compensating DC offset within a radio receiver. By adjusting the frequency of the local oscillator signal of the radio receiver to substantially match the frequency of the local oscillator signal of the transmitting radio, the DC offset is effectively removed from the radio receiver. As such, errors associated with DC offset are eliminated.

Other embodiments may be derived from the teaching of the present invention, without deviating from the scope of the claims.

Figure 9A:
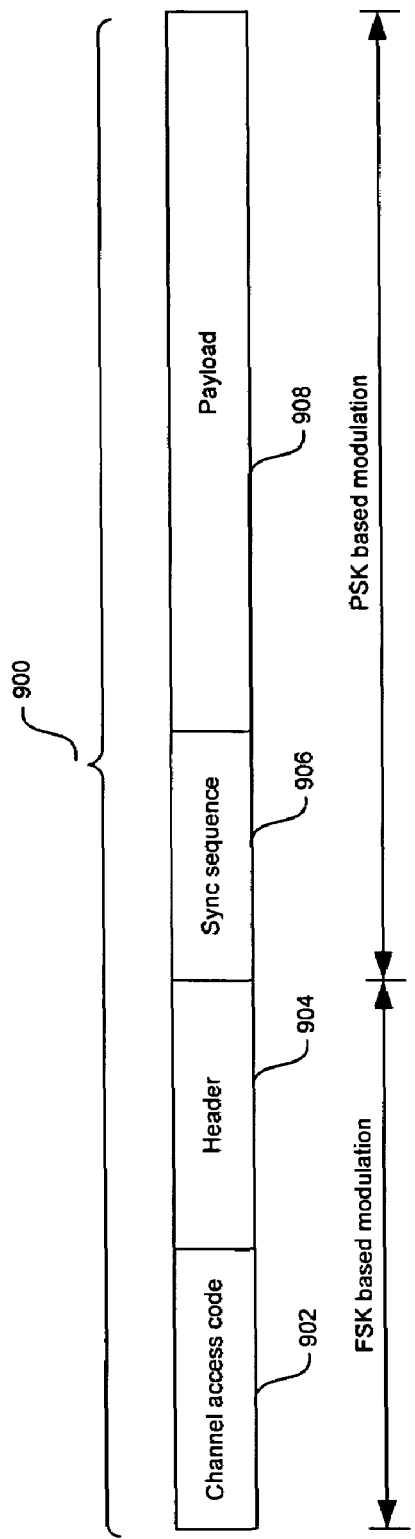
FIG. 9A illustrates an exemplary Bluetooth packet structure that may be utilized in connection with an embodiment of the invention.

FIG. 9A illustrates an exemplary Bluetooth packet structure, which may be utilized in connection with an embodiment of the present invention. Referring to FIG. 9A, a general packet structure format for an exemplary Bluetooth packet 900 may comprise a channel access code 902, a header 904, a synchronization (sync) sequence 906, and a payload 908. In this regard, a portion of the Bluetooth packet 900 may also be referred to as a field. The channel access code 902 may comprise a portion of the Bluetooth packet 900 that may be utilized to identify packets on a particular physical channel and/or to exclude or ignore packets on a different physical channel that may be using the same radio frequency (RF) carrier. All packets sent in the same physical channel may have a similar access code, for example.

The channel access code 902 may comprise 72 bits or it may comprise 68 bits when implemented in a shortened access code format, for example. In a receiver device, a sliding correlator may be utilized to correlate at least a portion of the contents of the channel access code 902. The sliding correlator may generate a trigger to indicate that a channel access code match has occurred when a threshold level has been exceeded, for example.

The header 904 may comprise a portion of the Bluetooth packet 900 that may be utilized for indicating to a receiving device when a particular packet is addressed to that device, the type of packet, a sequential numbering of the packet to order the data packet stream, and/or the manner in which the packet may be routed internally to that device, for example. The header 904 may be utilized in physical channels that support physical links, logical transports, and logical links. The header 904 may be implemented by utilizing a Forward Error Correction (FEC) repetition code with a ⅓ rate, for example. In this regard, for an FEC repetition code of ⅓ rate, 18 bits of the content in the header 904 may be repeated three times to produce a header 904 with a length of 54 bits.

The sync sequence 906 may comprise a portion of the Bluetooth packet 900 that may be utilized to synchronize the contents of the payload 908. This synchronization may be necessary for cases when the payload 908 may be modulated utilizing a different scheme than for other portions of the Bluetooth packet 900. The sync sequence 906 may comprise a plurality of symbols and may have a fixed phase rotation between a first or reference symbol and a last symbol. For example, the sync sequence 906 may comprise a time duration of 11 μs and may also comprise a phase rotation from the first reference symbol to the last symbol of $3\pi/2$. The payload 908 may comprise a portion of the Bluetooth packet 900 that may be utilized to transport user information. The sync sequence 906 and the payload 908 may comprise a total of up to 2745 bits.

The channel access code 902 and the header 904 may be modulated utilizing a Frequency Shift Keying modulation (FSK) scheme, for example. This modulation scheme may be utilized to provide backward compatibility between systems that support enhanced data rates (EDR), for example, 2 megabits per second (Mbps) transmissions or 3 Mbps transmissions, with systems that support slower data rates. In this regard, a receiving device that supports the slower data rates may be able to determine from the channel access code 902 and/or the header 904 that the current transmission is intended for a device that supports higher data rates. In an FSK modulation scheme, a plurality of equal-energy orthogonal signal waveforms that may differ in frequency may be generated. The FSK modulation scheme utilized for modulating the channel access code 902 and the header 904 may be a Gaussian FSK (GFSK) modulation scheme, for example, where the signal to be modulated may be filtered utilizing a Gaussian filter.

The sync sequence 906 and the payload 908 may be modulated utilizing a Phase Shift Keying (PSK) modulation scheme, for example. In a PSK modulation scheme, a plurality of equal-energy orthogonal signal waveforms that differ in phase may be generated. The PSK modulation scheme utilized for modulating the sync sequence 906 and the payload 908 may be a Differential PSK (DPSK) modulation scheme, for example, where differentially encoded phase information may be utilized. The DPSK modulation scheme may be an 8-DPSK modulation scheme or a $\pi/4$-DPSK modulation scheme, for example. The 8-DPSK may be utilized for 3 megabits per second (Mbps) transmissions and the $\pi/4$-DPSK modulation scheme may be utilized for 2 Mbps transmissions.

The FSK-based modulation scheme utilized for the channel access code 902 and the header 904 may require a larger signal-to-noise ratio (SNR) to demodulate than the PSK-based modulation scheme utilized for the sync sequence 906 and the payload 908. For example, in some instances, the FSK-based modulation scheme may require 14 dB of SNR to achieve a 1e-3 bit error rate (BER) while a PSK-based modulation scheme may require 10 dB of SNR to achieve a 1e-4 BER. Since the FSK-modulation scheme provides backward compatibility with prior technologies, it may be utilized for modulating the channel access code 902 and the header 904, even when it may result in a higher SNR requirement than for a PSK-based modulation.

Figure 9B:
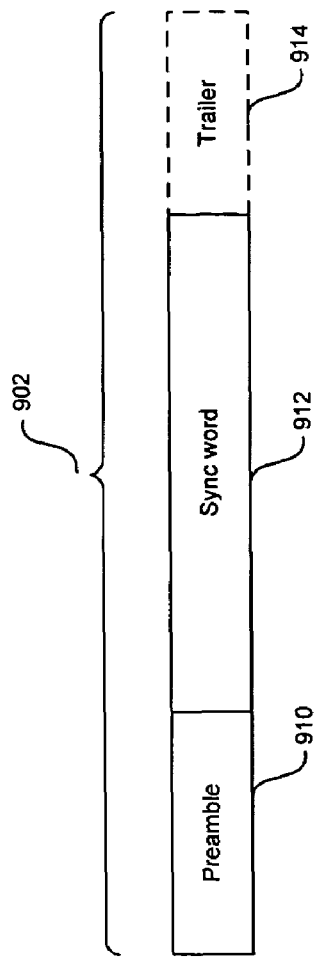
FIG. 9B illustrates an exemplary channel access code portion of a Bluetooth packet structure that may be utilized in connection with an embodiment of the invention.

FIG. 9B illustrates an exemplary channel access code portion of a Bluetooth packet structure, which may be utilized in connection with an embodiment of the present invention. Referring to FIG. 9B, the channel access code 902 in FIG. 9A may comprise a preamble 910, a sync word 912, and a trailer 914. The preamble 910 may comprise a fixed zero-one pattern of four symbols that may be utilized to facilitate the DC offset compensation. The fixed zero-one pattern may be 1010 when a first symbol of the sync word 912 is a logic 1, and may be 0101 when the first symbol of the sync word 912 is a logic 0. The sync word 912 may comprise a 64-bit code word that may be constructed to provide good auto correlation properties in order to improve timing acquisition. In this regard, the sync word 912 may be utilized to synchronize the incoming packet with the local timing information in the receiving device. The trailer 914 may comprise a fixed zero-one pattern of four symbols that may be utilized to facilitate an extended DC offset compensation. The fixed zero-one pattern may be 1010 when a last symbol of the sync word 912 is a logic 0, and may be 0101 when the last symbol of the sync word 912 is a logic 1.

Figure 10:
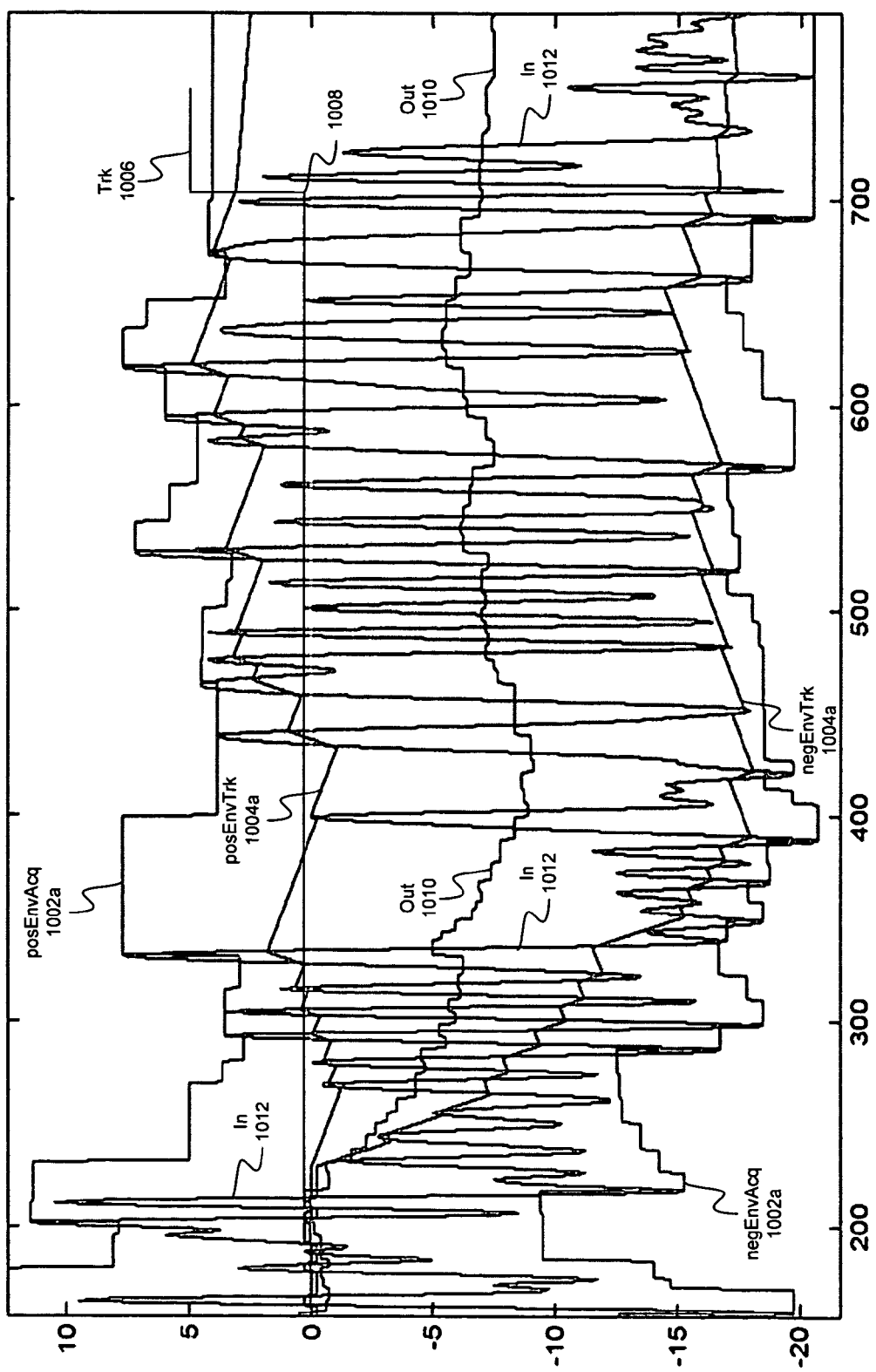
FIG. 10 is a graph illustrating tracking of an input waveform, which is utilized for adjusting DC offset slice point in an RF receiver, in accordance with an embodiment of the invention.

FIG. 10 is a graph illustrating tracking of an input waveform, which is utilized for adjusting DC offset slice point in an RF receiver, in accordance with an embodiment of the invention. Referring to FIG. 10, there is shown a positive acquisition envelope (posEnvAcq) 1002a, a negative acquisition envelope (negEnvAcq) 1002b, a positive tracking envelope (posEnvTrk) 1004a, a negative tracking envelope (negEnvTrk) 1004b, an input signal (In) 1012, an output signal (Out) 1010, and a tracking signal (Trk) 1006. FIG. 10 illustrates an exemplary scenario in which a receiver frequency may be less than a transmitter frequency since the DC offset slice point lies below the DC reference 0 on the vertical axis.

The acquisition envelopes posEnvAcq 1002a and negEnvAcq 1002b may respond quickly to changes of the input signal In 1012. The positive acquisition envelope posEnvAcq 1002a may quickly follow the input signal In 1012 when it increases, while not following as quickly when the signal decreases. Similarly, The negative acquisition envelope negEnvAcq 1002b may quickly follow the input signal In 1012 when it decreases, while not following as quickly when the signal increases. This will be illustrated in FIG. 11. The tracking envelopes posEnvTrk 1004a and negEnvTrk 1004b may respond more slowly to changes in the input signal In 1012. This will be illustrated in FIG. 12.

The tracking envelopes may be regarded as damped response signals to the input signal In 1012. The output signal Out 1010 may be generated from acquisition mode envelopes posEnvAcq 1002a and negEnvAcq 1002b and/or the tracking mode envelopes posEnvTrk 1004a and negEnvTrk 1004b. The tracking signal Trk 1006 may indicate when tracking occurs after recognizing and synchronizing the SYNC word. In this regard, synchronization may occur at 1008, at which time the tracking signal Trk 1006 may be asserted. Acquisition mode occurs prior to the tracking signal Trk 1006 being asserted, and tracking mode occurs after the tracking signal Trk 1006 being asserted.

In operation, the input signal In 1012 may be converted to digital values, and the digital values may be processed to generate the acquisition envelopes posEnvAcq 1002a and the negEnvAcq 1002b, and the tracking envelopes posEnvTrk 1004a and the negEnvTrk 1004b. During acquisition period, the output signal Out 1010 may be based on a weighted average of the four envelopes. In this regard, the output signal Out 1010 may be:

$$OUT = (posEnvAcq\ 1002a + negEnvAcq\ 1002b) * (AcqWeight) + (posEnvTrk\ 1004a + negEnvTrk\ 1004b) * (TrkWeight)$$

The weight values AcqWeight and TrkWeight may be design and/or implementation dependent. Therefore, the input signal In 1012 may be compared to the output signal Out 1010, and the value of the output signal Out 1010 may be the slicing point at that time for the input signal In 1010. If the value of the input signal In 1012 is higher than the value of the slice point, or the output signal Out 1010 at that time, then the signal may be identified as logic one (1). Similarly, a signal value lower than the slice point value may be identified as logic zero (0).

After the synchronization period, for example, when the tracking signal TRK 1006 is asserted after the synchronization point 1008, the output signal Out 1010 may be based on an average of the two tracking envelopes posEnvTrk 1004a and negEnvTrk 1004b. In this regard, the output signal Out 1010 may be:

Out=[(*posEnvTrk* 1004a+*negEnvTrk* 1004b)/2.

However, it may still be desirable at times to generate the output signal Out 1010 using all four envelopes even after the synchronization period. For example, the output signal Out 1010 may be generated using all four envelopes when the input signal In 1012 is changing rapidly.

Although an embodiment of the invention may have specified digital values, the invention need not be so limited. The slice points may be determined utilizing a digital circuit, analog circuit, and/or a processor, for example, or a digital signal processor (DSP) that may be executing code. Additionally, a combination of digital hardware, analog hardware and/or a DSP may be utilized to implement an embodiment of the invention.

The following is an exemplary code listing that may be utilized for generating estimates of the DC offset, which may be utilized for adjusting DC offset slice points in an RF receiver, in accordance with an embodiment of the invention.

```
// BP1
    if (InaRssiOut < p.LnaThresh) {
        VposEnvTrk = 0;
        VnegEnvTrk = 0;
    }
// BP2
    // Accumulate for tracking
    VposEnvTrk += (Input>double(TI(VposEnvTrk)))?TT(IrgEnvDelta):
        TT(-smlEnvDelta);
    VnegEnvTrk += (Input<TI(VnegEnvTrk))?
    TT(-IrgEnvDelta):TT(smlEnvDelta);
// BP3
    if (!acqTrkZ) { // While waiting to sync
        // Get the direction of input change
        sigSlope = ((Input-InputZ)>=0);
        sigZero = (Input==InputZ);
// BP4
        // Slope direction change means extremum detected
        if (((sigSlopeZ!=sigSlope)||(sigZero!=sigZeroZ))&&!sigZero) {
            // Some useful differences
            pDiff = TI(VposEnvAcq) – InputZ;
            nDiff = InputZ – TI(VnegEnvAcq);
// BP5
            if (!sigSlope) { // If Max...
// BP6
                if (pDiff<0)
                    VposEnvAcq = InputZ;
// BP7
                else if ((nDiff>(p.acqThreshSel?12:8)) && (nDiff>=0))
                    VposEnvAcq –= pDiff/((pDiff>6)?2:(pDiff>2)?4:8);
            }
            else {     // Else if min...
// BP8
                if (nDiff<0)
                    VnegEnvAcq = InputZ;
// BP9
                else if ((pDiff>(p.acqThreshSel?12:8)) && (pDiff>=0))
                    VnegEnvAcq += nDiff/((nDiff>6)?2:((nDiff>2)?4:8));
            }
// BP10
            Output = (TI(VposEnvAcq) + TI(VnegEnvAcq))*p.AcqWgt
                + (TI(VposEnvTrk) + TI(VnegEnvTrk))*p.TrkWgt;
        }
//BP11
        // Register update
        sigSlopeZ = sigSlope;
        sigZeroZ = sigZero;
    }
// BP12
    else if (p.enDefault) // After sync
        Output = (TI(VposEnvTrk) + TI(VnegEnvTrk))/2; //.
```

In the code above, all the variables used may have signed values. However, this need not be limited in this manner. The specific types used for the variables may depend on the type of processor that may be used. Additionally, TI and TT may be parts of templates that allow variables to be defined as dictated by function declarations. For example, a variable may have an attribute as a fixed point variable and the number of bits to the left of the decimal point may be fixed.

Accordingly, in the code above, at the line BP1, a value of an input signal strength variable InaRssiOut may be compared to the value of a threshold variable p.LnaThresh. If the value of the input signal strength variable InaRssiOut is less than the value of the threshold variable p.LnaThresh, then acquisition mode may be entered by setting the values of variables VposEnvTrk and VnegEnvTrk to zeros. These two variables may correspond to the tracking envelopes posEnvTrk 1004a and negEnvTrk 1004b.

At line BP2, the value of the present input variable Input may be compared to the values of the variables VposEnvTrk and VnegEnvTrk. If the value of the input variable Input is larger than the value of the variable VposEnvTrk, the variable VposEnvTrk may be increased by an appropriate amount lrgEnvDelta. If the value of the variable Input is less than or equal to the value of the variable VposEnvTrk, the value of the variable VposEnvTrk may be decreased by an appropriate amount smlEnvDelta. Similarly, if the value of the variable Input is smaller than the value of the variable VnegEnvTrk, the value of the variable VposEnvTrk may be decreased by an appropriate amount lrgEnvDelta. If the value of the variable Input is greater than or equal to the value of the variable VposEnvTrk, the value of the variable VposEnvTrk may be increased by an appropriate amount smlEnvDelta. In this manner, the increases and decreases in the values of the variables VposEnvTrk and VnegEnvTrk may be fixed values. These values may be design and/or implementation dependent.

At line BP3, a variable ackTrkZ may be checked. The value of zero may indicate that acquisition mode is in progress. The value of non-zero may indicate that tracking mode is in progress. Accordingly, if acquisition mode is in progress, the code described for line BP3 to line BP11 may apply. If acquisition mode is not in progress, that is, tracking mode is in progress, the code described for line BP12 may apply. Therefore, if acquisition mode is in progress, a variable sigSlope may be assigned a value of one if the value of the variable Input is greater than or equal to the value of the previous input variable InputZ. Otherwise, a value of zero may be assigned to the variable sigSlope.

Additionally, a variable sigzero may be assigned a value of one if the value of the variable Input is equal to the value of the previous input variable InputZ. Otherwise, the variable sigzero may be assigned a value of zero. A value of one for the variable sigSlope may indicate that the slope of the input signal is flat or it is rising. A value of zero may indicate that the slope of the input signal is falling. A value of one for the variable sigzero may indicate that there was no change in the input signal and a value of zero may indicate that there was a change in the input signal.

At line BP4, it is determined whether a change in direction of the slope has been detected. This may indicate that a local maximum or a local minimum, either of which may be referred to as an extremum, may have been detected. In order to identify this condition, the code may determine whether there is a change in the input signal value, and if either the value of the variable sigSlope changed from a one to a zero, or vice versa, or if the value of variable sigzero changed from a one to a zero, or vice versa. If an extremum is detected, the code described for the rest of line BP4 to line BP10 may apply. Otherwise, there may be a jump in execution of the code to the code described for line BP11.

Therefore, if an extremum is detected, a variable pDiff may be assigned a value of the variable VposEnvAcq minus the value of the previous input variable InputZ, and a variable nDiff may be assigned a value of the previous input variable Inputz minus the value of the variable negEnvAcq. These two variables VposEnvAcq and VnegEnvAcq may correspond to the acquisition envelopes posEnvAcq 1002a and negEnvAcq 1002b. At line BP5, it may be determined whether the variable sigslope has a value of zero, that is, if the variable sigslope indicates that the slope is falling. Since there was a change in slope direction, the previous slope may have been rising. This may indicate that a local maximum may have been detected. Therefore, the value of the variable VposEnvAcq may need to be changed. At line BP6, it may be determined whether the value of the variable pDiff is less than zero, that is, if the value of the variable VposEnvAcq is less than the value of the previous input variable InputZ. If so, the value of the variable VposEnvAcq may be set to the value of the previous input variable InputZ. If the value of the variable pDiff is not less than zero, then it may be determined at line BP7 whether the value of the variable nDiff is greater than a selectable threshold value. The specific threshold values that may be selected, and the specific threshold value selected for use, may be design and/or implementation dependent.

If the value of the variable nDiff is greater than the threshold value selected, then the value of the variable VposEnvAcq may be decreased by an amount that may be correlated to the amount by which the value of the variable VposEnvAcq is greater than the value of the previous input variable InputZ. Accordingly, while the value of the variable VposEnvAcq may be set equal to the higher input signal value, it may not be set equal to the lower input signal value. Rather, the amount reduced for the value of the variable VposEnvAcq may be related to the value of the variable VnegEnvAcq and how much larger the previous input signal value may be than the value of the variable VposEnvAcq.

At line BP8, since an extremum was detected and it was not a local maximum, a similar process may take place for the local minimum that was detected. If the value of the variable nDiff is less than zero, that is, if the value of the previous input variable InputZ is less than the value of the variable VnegEnvAcq, then the value of the variable VnegEnvAcq may be set to the value of the previous input variable InputZ. If the value of the variable nDiff is not less than zero, then, at line BP9, it may be determined whether the value of the variable pDiff is greater than a selectable threshold value. The specific threshold values that may be selected, and the specific threshold value selected for use, may be design and/or implementation dependent.

If the value of the variable pDiff is greater than the threshold value selected, then the value of the variable VnegEnvAcq may be increased by an amount that may be correlated to the amount by which the value of the previous input variable InputZ may be greater than the value of the variable VnegEnvAcq. Accordingly, the value of the variable VnegEnvAcq may be set equal to the value of the previous input variable InputZ if the absolute value of the previous input variable Inputz is greater than the absolute value of the variable VnegEnvAcq. Otherwise, the amount added to the value of the variable VnegEnvAcq may be related to how much larger the absolute value of the previous input variable InputZ is than the absolute value of the variable VnegEnvAcq.

At line BP10, a variable Output may be generated by adding two terms. The first term may be generated by adding the value of the variable VposEnvAcq to the value of the variable VnegEnvAcq, and then multiplying by an acquisition weight. The second term may be generated by adding the value of the variable VposEnvTrk to the value of the variable VnegEnvTrk, and then multiplying by a tracking weight. The variable Output may correspond to the output signal Out 1010 and may be the value of the DC offset. At line BP11, the variables sigSlopeZ and sigZeroZ may be assigned the values of the variables sigslope and sigzero, respectively.

At line BP12, if acquisition mode is not in progress, it may be determined whether the tracking mode calculation may be used for the variable Output. This may usually be enabled. The tracking mode calculation for the variable Output may average the values of the two variables VposEnvTrk and VnegEnvTrk.

Figure 11:
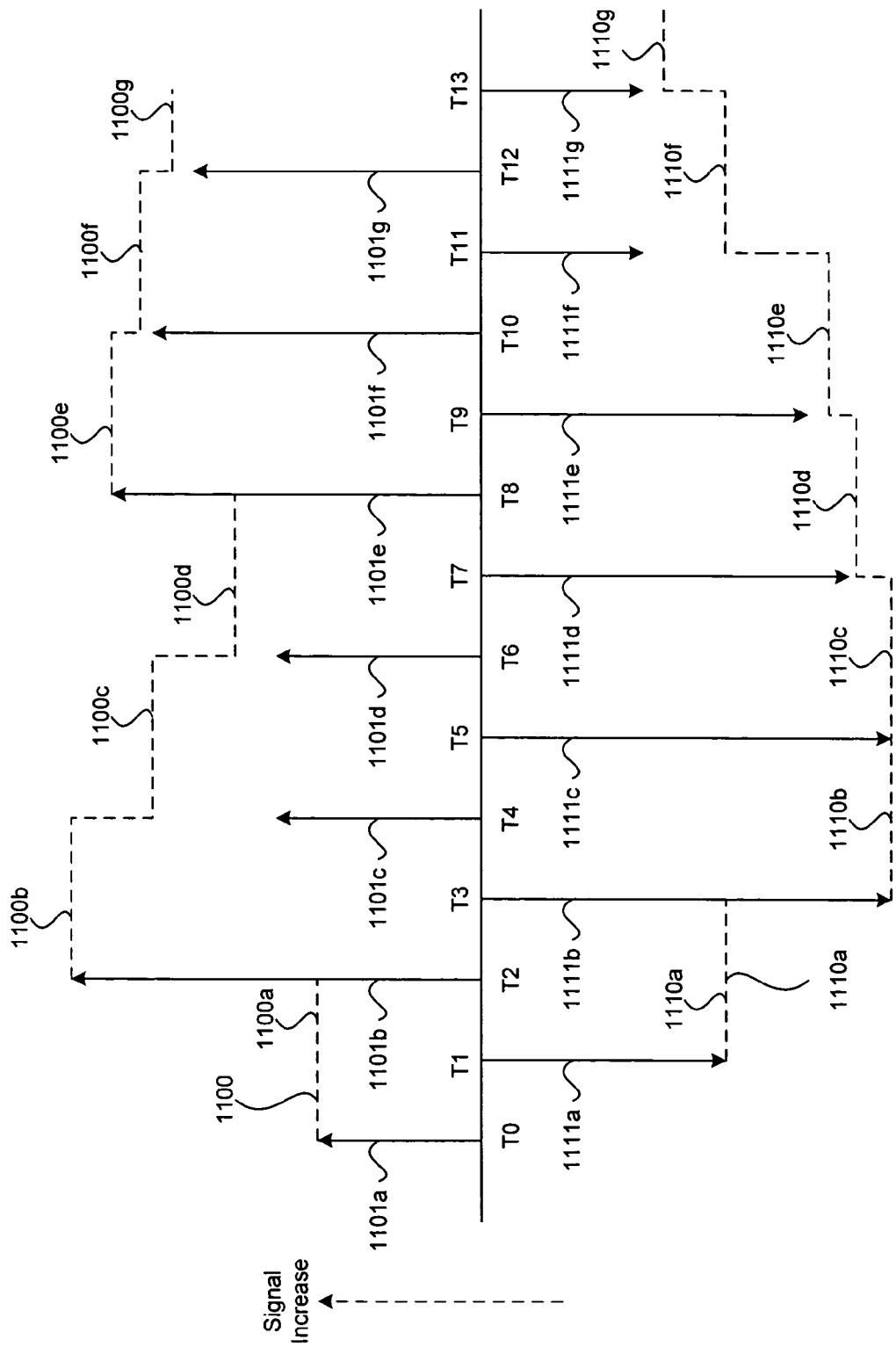
FIG. 11 is a graph illustrating acquisition envelopes, in accordance with an embodiment of the invention.

FIG. 11 is a graph illustrating acquisition envelopes, in accordance with an embodiment of the invention. Referring to FIG. 11, there is shown the positive acquisition envelope posEnvAcq 1100 and a negative acquisition envelope negEnvAcq 1110. The various levels of these envelopes may be indicated by 1100a-1110g and 1110a-1110g. There is also shown a plurality of positive signal strength indicators 1101a-g and a plurality of negative signal strength indicators 1111a-g. The positive acquisition envelope posEnvAcq 1100 and the negative acquisition envelope negEnvAcq 1110 may be similar to the positive acquisition envelope posEnvAcq 1002a and negative acquisition envelope negEnvAcq 1002b, respectively, of FIG. 10. The plurality of signal strength indicators 1101a-g and 1111a-g may represent signal strengths of an input signal at discrete points in time T1-T13.

The positive acquisition envelope posEnvAcq 1100 may increase to the value of one of the positive signal strength indicators 1101a-g if the value of the positive signal strength indicator is greater than or equal to the value of the positive acquisition envelope posEnvAcq 1100. Otherwise, the value of the positive acquisition envelope posEnvAcq 1100 may drop by a value that may depend on the values of the positive acquisition envelope posEnvAcq 1100, the positive signal strength indicator and the negative acquisition envelope negEnvAcq 1110.

Similarly, the negative acquisition envelope negEnvAcq 1110 may fall to the value of one of the negative signal strength indicator 1111a-g if the value of the negative signal strength indicator is less than the value of the negative acquisition envelope negEnvAcq 1110. Otherwise, the value of the negative acquisition envelope negEnvAcq 1110 may increase by a value that may depend on the values of the negative acquisition envelope negEnvAcq 1110, the negative signal strength indicator and the positive acquisition envelope posEnvAcq 1100. The change in the signals may occur in a manner similar to the description of the code with respect to the lines BP3-BP9.

In operation, the positive acquisition envelope posEnvAcq 1100 may be at a level 1100a that may be the same as the level of the positive signal strength indicator 1101a at time T0. At time T2, the positive acquisition envelope posEnvAcq 1100 may increase to the level 1100b that may be the same as the level of the positive signal strength indicator 1101b at time T2. At time T4, the positive signal strength indicator 1101c may be at a level that is less than the previous level 1100b of the positive acquisition envelope posEnvAcq 1100. Therefore, the positive acquisition envelope posEnvAcq 1100 may drop to the level 1100c that is below the previous level 1100b, but above the level of the positive signal strength indicator 1101c at time T4. Similarly, the positive acquisition envelope posEnvAcq 1100 may change at times T6, T8, T10 and T12.

The negative acquisition envelope negEnvAcq 1110 may be at a level 1110a that may be the same as the level of the negative signal strength indicator 1111a at time T1. At time T3, the negative acquisition envelope negEnvAcq 1110 may decrease to the level 1110b that may be the same as the level of the negative signal strength indicator 1111b at time T3. At time T5, the negative signal strength indicator 1111c may be at a level that may be the same as the previous level 1110b of the negative acquisition envelope negEnvAcq 1110. Therefore, the negative acquisition envelope negEnvAcq 1110 may remain at the level 1110c that may be the same as the previous level 1100b. At time T7, the level of the negative signal strength indicator 1111d may increase. Therefore, the negative acquisition envelope negEnvAcq 1110 may increase to the level 1110d, which may be above the previous level 1110c of the negative acquisition envelope negEnvAcq 1110 but below the level of the negative signal strength indicator 1111d. Similarly, the negative acquisition envelope negEnvAcq 1110 may change at times T9, T11 and T13.

Figure 12:
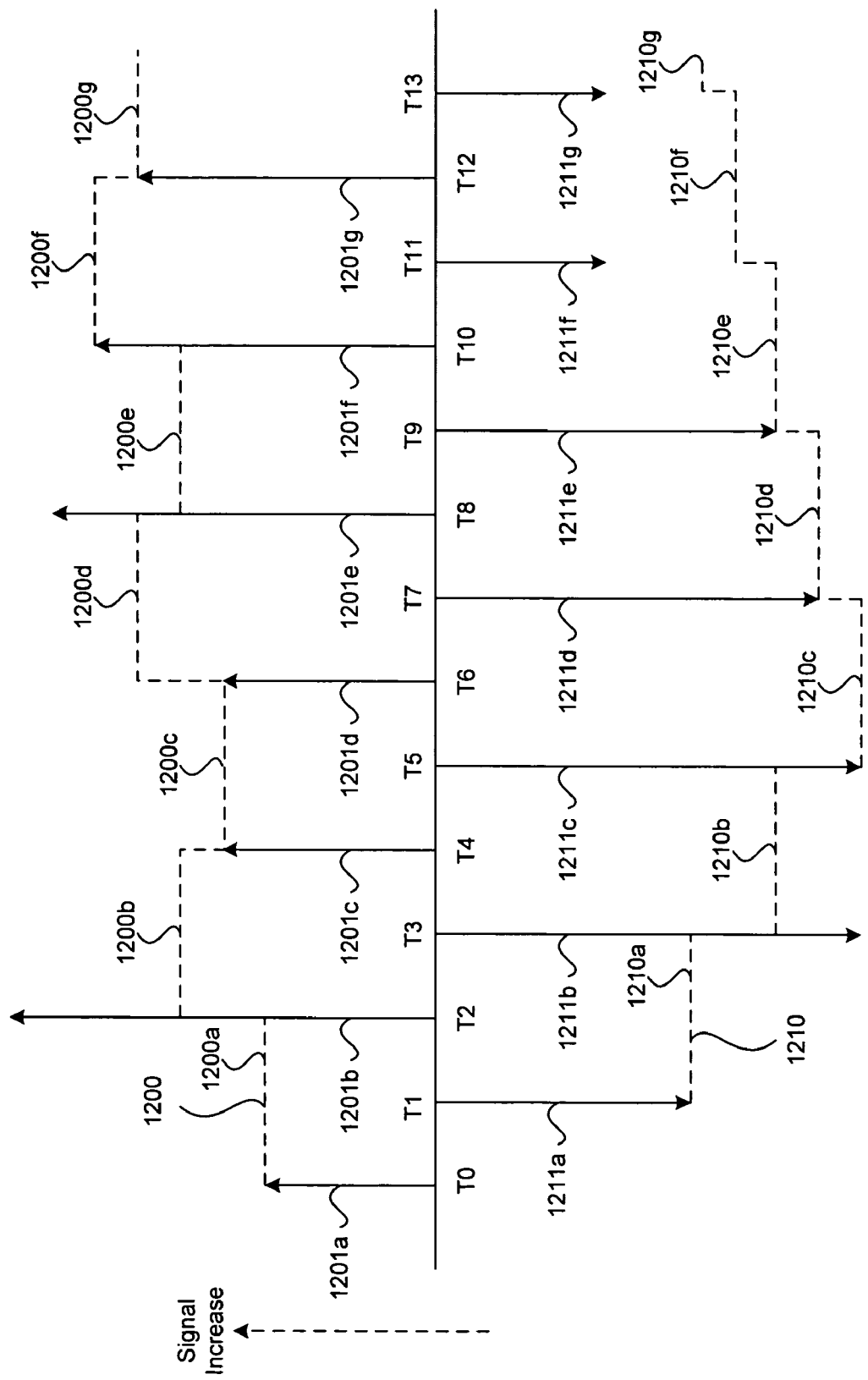
FIG. 12 is a graph illustrating tracking envelopes, in accordance with an embodiment of the invention.

FIG. 12 is a graph illustrating tracking envelopes, in accordance with an embodiment of the invention. Referring to FIG. 12, there is shown the positive tracking envelope posEnvTrk 1200 and a negative tracking envelope negEnvTrk 1210. The various levels of these envelopes may be indicated by 1200a-g and 1210a-g. There is also shown a plurality of positive signal strength indicators 1201a-g and a plurality of negative signal strength indicators 1211a-g. The strengths of these signals at various time points may be indicated by 1211a-g and 1211a-g. The positive tracking envelope posEnvTrk 1200 and the negative tracking envelope negEnvTrk 1210 may be similar to the positive tracking envelope posEnvTrk 1004a and negative tracking envelope negEnvTrk 1004b, respectively, of FIG. 10. The plurality of signal strength indicators 1211a-g and 1211a-g may represent signal strengths of an input signal at discrete points in time T0-T13.

The positive tracking envelope posEnvTrk 1200 may increase by a constant rate if it is less than or equal to one of the positive signal strength indicators 1201a-g. Otherwise, the value of the positive tracking envelope posEnvTrk 1200 may decrease at another constant rate. The rate of decrease may be less than the rate of increase for the positive tracking envelope posEnvTrk 1200.

Similarly, the negative tracking envelope negEnvTrk 1210 may increase at a constant rate if it is less than or equal to one of the negative signal strength indicators 1211a-g. Otherwise, the value of the negative tracking envelope negEnvTrk 1210 may decrease at a constant rate. The constant rate for decrease may be greater than the constant rate for increase for the negative tracking envelope negEnvTrk 1200. The change in the signals may occur in a manner similar to the description of the code with respect to the line BP2.

In operation, the positive tracking envelope posEnvTrk 1200 may be at a level 1200a that is the same as the level of the positive signal strength indicator 1201a at time T0. At time T2, the positive tracking envelope posEnvTrk 1200 may be less than the level of the positive signal strength indicator 1201b at time T2. Therefore, the positive tracking envelope posEnvTrk 1200 may increase to the level 1200b by a constant value. At time T4, the positive signal strength indicator 1201c may be at a level that is less than the previous level 1200b of the positive tracking envelope posEnvTrk 1200. Therefore, the positive tracking envelope posEnvTrk 1200 may decrease by another constant value to the level 1200c. Similarly, the positive tracking envelope posEnvTrk 1200 may change at times T6, T8, T10 and T12.

The negative tracking envelope negEnvTrk 1210 may be at a level 1210a that may be the same as the level of the negative signal strength indicator 1211a at time T1. At time T3, the negative tracking envelope negEnvTrk 1210 may decrease to the level 1210b that may be greater than the level of the negative signal strength indicator 1211b at time T3. At time T5, the negative signal strength indicator 1211c may be at a level that may be the same as the level of the previous negative signal strength indicator 1211b. Since the previous level 1210b of the negative tracking envelope negEnvTrk 1210 may be greater than the level of the negative signal strength indicator 1211c, the level of the negative tracking envelope negEnvTrk 1210 may decrease to level 1210c. At time T7, the level of the negative signal strength indicator 1211d may increase. Therefore, the negative tracking envelope negEnvTrk 1210 may increase to the level 1210*d*. Similarly, the negative tracking envelope negEnvTrk 1210 may increase at times T9, T11 and T13.

Figure 13:
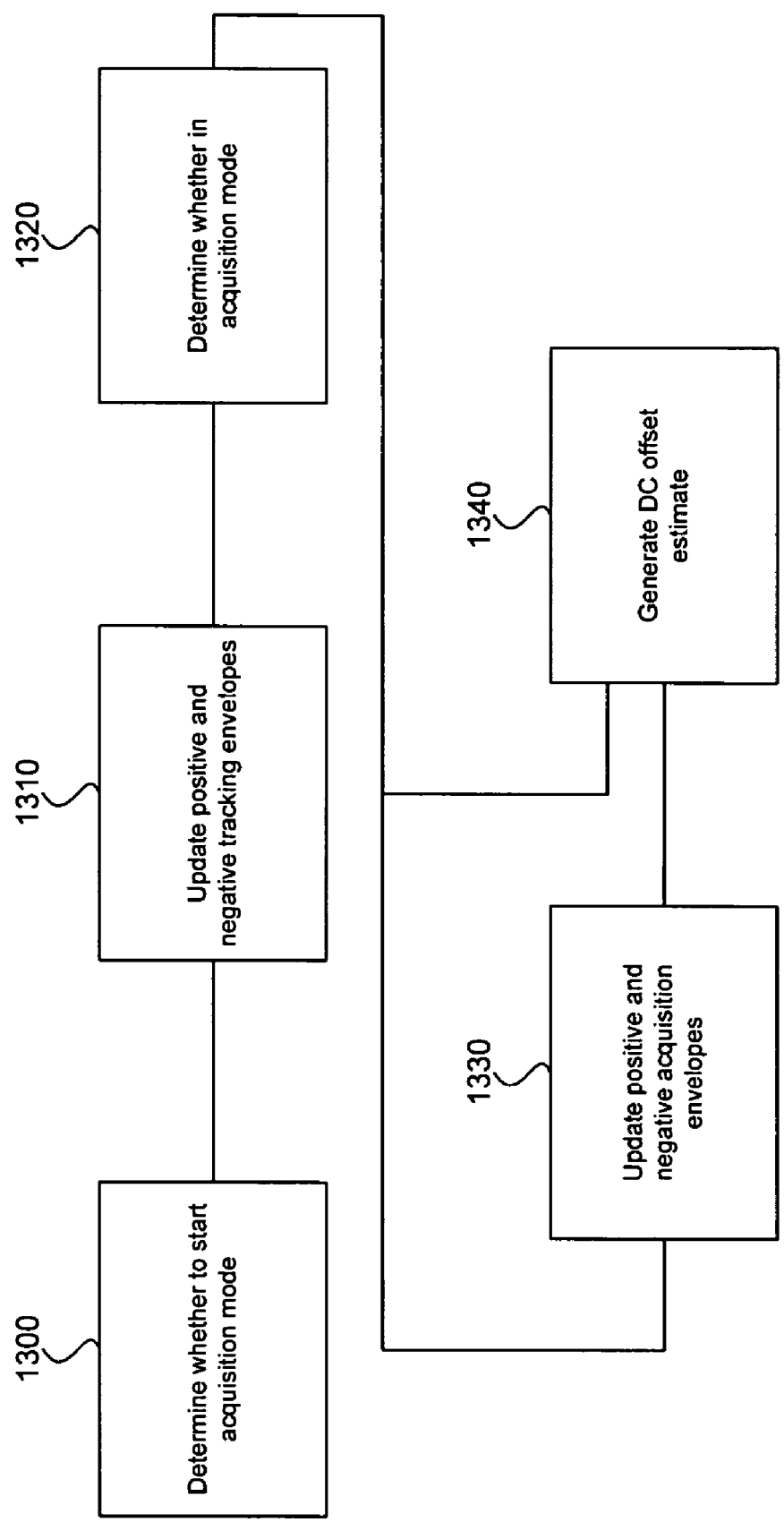
FIG. 13 illustrates an exemplary flow diagram illustrating estimating the DC offset of an input signal, in accordance with an embodiment of the invention.

FIG. 13 illustrates an exemplary flow diagram illustrating estimating the DC offset of an input signal, in accordance with an embodiment of the invention. Referring to FIG. 13, step 1300 may comprise determining whether to start an acquisition mode. Step 1310 may comprise updating positive and negative tracking envelopes with information from the latest signal strength. Step 1320 may comprise determining whether to update positive and negative acquisition envelopes. Step 1330 may comprise updating positive and negative tracking envelopes with information from the latest signal strength. Step 1340 may comprise estimating the DC offset of the input signal.

Referring to FIGS. 1, 9B, 10 and 13, the steps 1300 to 1340 may be utilized to generate a DC offset estimate that may be utilized to slice received data bits. Received RF signals may have a DC offset because of noise. For example, the noise may be introduced by the transmitting device of the RF signals or by the receiving device of the RF signals. The noise may also be introduced by stray electromagnetic fields during propagation of the RF signals. Another source of noise may be because there is a frequency mismatch in the local IF signals generated by the transmitting device and the receiving device. Unrecognized DC offset may lead to faulty identification of logic zero or logic one states of the received signals, and this may lead to inability to transfer information between the transmitting device and the receiving device.

In order to detect DC offset, a receiving device may track received signal strengths, including the maxima and minima. This data may be processed via an algorithm to estimate the DC offset, which may then be used to determine the bit state of the received signal. A receiving device may have two modes for receiving data. The first mode may be an acquisition mode where the receiving device may be trying to synchronize to the received signal. The other mode may be the tracking mode where the receiving device has synchronized to the received signal and is receiving data that may be part of a payload.

In step 1300, a determination may be made whether a new acquisition mode may need to be started. A received signal strength indicator may be utilized to determine whether a received signal may be below an expected threshold signal strength. If the received signal strength indicator is below the threshold, the receiving device may determine that the transmitting device is not transmitting data. The received strength may be low because the transmitting device, for example, the base station 12, may have finished sending data, for example, a packet. Therefore, the receiving device, for example, the PDA 18, may need to enter acquisition mode in order to determine when the transmitting device is sending new data. The transmitting device may send a synchronizing signal before the payload of data in order to ensure that the receiving device is able to recognize and lock on to the presence of new data.

A task that may need to be done for a new acquisition cycle may be setting the positive and negative tracking envelopes to a default value, which may be zero. If a new acquisition cycle is not required, that is, the received signal strength indicator is above the threshold, then the estimation of the DC offset may continue.

In step 1310, the positive and negative tracking signals may be updated with information from the latest received signal strength. For example, if the received signal strength is greater than the value of the positive tracking envelope, the positive tracking envelope value may be increased by a constant amount. If not, the positive tracking envelope value may be decreased by another constant amount. The constant amount by which the positive tracking envelope may be increased may be larger than the constant amount by which the positive tracking envelope may be decreased.

Similarly, if the received signal strength is less than the value of the negative tracking envelope, the negative tracking envelope value may be decreased by a constant amount. If not, the negative tracking envelope value may be increased by another constant amount. The constant amount by which the negative tracking envelope may be decreased may be larger than the constant amount by which the negative tracking envelope may be increased. The constant amount by which the positive tracking envelope may be increased may be the same as the constant amount by which the negative tracking envelope may be decreased. And, the constant amount by which the positive tracking envelope may be decreased may be the same as the constant amount by which the negative tracking envelope may be increased.

The values of the constant amounts may be design and implementation dependent, and the constant amounts need not be the same. The tracking envelopes may be designed to lag behind the actual signal strengths. That is, the tracking envelopes may be considered to be a damped response of the signal strength. This may be to allow a tolerance for a certain amount of noise. For example, if a noise burst lowered the signal strength, an undamped response may react immediately to the noise by lowering the tracking envelopes. This may affect processing the received signal, which may have been transmitting logical zeros, such that the received signal may be interpreted to be logical ones.

However, while this may be useful for receiving data over a relatively long period of time, for example, the time equivalent to many tens or hundreds of bits, this may not work as well for acquisition mode when the number of bits to identify may be much less. For example, the preamble 910 of a Bluetooth transmission may only have four cycles of one and zero to facilitate DC offset estimate. Therefore, a quicker response envelope may be needed during the acquisition mode.

In step 1320, a determination may be made of whether the receiving device is in an acquisition mode or tracking mode. This may be via a tracking signal TRK 1006 that may be, for example, a register bit, that may be asserted, which may indicate that a successful synchronization has taken place. If the receiving device is in a tracking mode, then the next step may be step 1340. Upon a determination, in step 1300, that a new acquisition mode may need to be started, the tracking signal may be deasserted. This may indicate that the receiving device is not in tracking mode and may be in acquisition mode.

In step 1330, the positive and negative acquisition envelopes may be updated. Step 1330 may be required because the tracking signal may not be asserted, thereby indicating that the receiving device is still in acquisition mode. In order to quickly estimate the DC offset during the acquisition mode, the positive and negative acquisition envelopes may not be damped as much as the positive and negative tracking envelopes. Accordingly, the positive acquisition envelope may be set to the peak value of each identified local maximum if that local maximum is larger than or equal to the previous local maximum. Similarly, the negative acquisition envelope may be set to the peak value of each identified local minimum if that local minimum is less than or equal to the previous local minimum. Since transmission of a signal, whether affected by noise or not, may be sinusoidal, there will be at least one local maximum and at least one local minimum per each period of the sinusoid.

However, if the local maximum is less than the previous local maximum, then the positive acquisition envelope may be decreased. The amount decreased may depend on the strength of the received signal, the value of the positive acquisition envelope, and the value of the negative acquisition envelope. Similarly, if the local minimum is greater than the previous local minimum, then the negative acquisition envelope may be increased. The amount increased may depend on the strength of the received signal, the value of the positive acquisition envelope, and the value of the negative acquisition envelope.

In step 1340, the DC offset estimate may be generated. During the tracking mode, the DC offset may depend on the positive tracking envelope and the negative tracking envelope. The DC offset may be calculated by taking an average of the two envelopes. By using only the tracking envelopes, the DC offset estimate may be tolerant of spurious noise. During acquisition mode, the DC offset estimate may be calculated by taking a weighted average of the tracking envelopes and the acquisition envelopes. The weight to be applied to the tracking envelopes and the weight to be applied to the acquisition envelopes may be design and implementation dependent. Generally, the positive and negative tracking envelopes may be added together and multiplied by a weighting factor. Similarly the positive and negative acquisition envelopes may be added together and multiplied by another weighting factor. These two values may then be added together. The two weighting factors may or may not be the same.

Another embodiment of the invention mat provide a machine-readable storage, having stored thereon, a computer program having at least one code section executable by a machine, thereby causing the machine too perform the steps as described for adjusting DC offset slice point in an RF receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for direct current (DC) offset compensation in a receiver, the method comprising:
    estimating DC offset using fast tracking and slow tracking wherein:
        said fast tracking uses positive and negative acquisition envelopes which correspond to a first estimation of maxima and minima of an input signal;
        said fast tracking uses positive and negative tracking envelopes which correspond to a second estimation of said maxima and minima of said input signal; and
        said slow tracking uses said positive and negative tracking envelopes; and
        said positive and negative acquisition envelopes respond more quickly to changes in said input signal than do said positive and negative tracking envelopes; and
    adjusting a DC offset slice point based on said estimating.

2. The method according to claim 1, comprising executing said fast tracking prior to executing said slow tracking.

3. The method according to claim 1, comprising acquiring synchronizing signals transmitted before a payload via said fast tracking.

4. The method according to claim 1, comprising averaging said acquisition envelopes and said tracking envelopes for said fast tracking.

5. The method according to claim 4, comprising applying a fast tracking weighting factor to a sum of said positive acquisition envelope and said negative acquisition envelope.

6. The method according to claim 4, comprising applying a slow tracking weighting factor to a sum of said positive tracking envelope and said negative tracking envelope.

7. The method according to claim 1, comprising averaging said positive and negative tracking envelopes for said slow tracking.

8. The method according to claim 7, comprising applying a slow tracking weighting factor to a sum of said positive and negative tracking envelopes.

9. A machine-readable storage having stored thereon, a computer program having at least one code section for DC offset compensation, the at least one code section being executable by a machine for causing the machine to perform steps comprising:
    estimating DC offset using fast tracking and slow tracking wherein:
        said fast tracking uses positive and negative acquisition envelopes which correspond to a first estimation of maxima and minima of an input signal;
        said fast tracking uses positive and negative tracking envelopes which correspond to a second estimation of said maxima and minima of said input signal; and
        said slow tracking uses said positive and negative tracking envelopes; and
        said positive and negative acquisition envelopes respond more quickly to changes in said input signal than do said positive and negative tracking envelopes; and
    adjusting a DC offset slice point based on said estimating.

10. The machine-readable storage according to claim 9, wherein the at least one code section comprises code for executing said fast tracking prior to executing said slow tracking.

11. The machine-readable storage according to claim 9, wherein the at least one code section comprises code for acquiring synchronizing signals transmitted before a payload via said fast tracking.

12. The machine-readable storage according to claim 9, wherein the at least one code section comprises code for averaging said acquisition envelopes and said tracking envelopes for said fast tracking.

13. The machine-readable storage according to claim 12, wherein the at least one code section comprises code for applying a fast tracking weighting factor to a sum of said positive acquisition envelope and said negative acquisition envelope.

14. The machine-readable storage according to claim 12, wherein the at least one code section comprises code for applying a slow tracking weighting factor to a sum of positive said tracking envelope and said negative tracking envelope.

15. The machine-readable storage according to claim 9, wherein the at least one code section comprises code for averaging said positive and negative tracking envelopes for said slow tracking.

16. The machine-readable storage according to claim 15, wherein the at least one code section comprises code for applying a slow tracking weighting factor to a sum of said positive and negative tracking envelopes.

17. A system for processing a signal, the system comprising:
one or more circuits in a receiver, wherein said one or more circuits are operable to:
estimate DC offset using fast tracking and slow tracking wherein:
said fast tracking uses positive and negative acquisition envelopes which correspond to a first estimation of maxima and minima of an input signal;
said fast tracking uses positive and negative tracking envelopes which correspond to a second estimation of said maxima and minima of said input signal; and
said slow tracking uses said positive and negative tracking envelopes; and
said positive and negative acquisition envelopes respond more quickly to changes in said input signal than do said positive and negative tracking envelopes; and
adjusting a DC offset slice point based on said estimating.

18. The system according to claim 17, wherein said one or more circuits are operable to execute said fast tracking prior to executing said slow tracking.

19. The system according to claim 17, wherein said one or more circuits are operable to use said fast tracking to acquire synchronizing signals transmitted before a payload.

20. The system according to claim 17, wherein said one or more circuits are operable to average said acquisition envelopes and said tracking envelopes for said fast tracking.

21. The system according to claim 20, wherein said one or more circuits are operable to apply a fast tracking weighting factor to a sum of said positive acquisition envelope and said negative acquisition envelope.

22. The system according to claim 20, wherein said one or more circuits are operable to apply a slow tracking weighting factor to a sum of said positive tracking envelope and said negative tracking envelope.

23. The system according to claim 17, wherein said one or more circuits are operable to average said positive and negative tracking envelopes for said slow tracking.

24. The system according to claim 23, wherein said one or more circuits are operable to apply a slow tracking weighting factor to a sum of said positive and negative tracking envelopes.

* * * * *